US012570809B2

(12) United States Patent
Takashima et al.

(10) Patent No.: US 12,570,809 B2
(45) Date of Patent: Mar. 10, 2026

(54) UNIDIRECTIONAL PREPREG, FIBER-REINFORCED THERMOPLASTIC RESIN SHEET, MANUFACTURING METHODS OF UNIDIRECTIONAL PREPREG AND FIBER-REINFORCED THERMOPLASTIC RESIN SHEET, AND MOLDED BODY

(71) Applicant: Suncorona Oda Co., Ltd., Komatsu (JP)

(72) Inventors: Yoshikazu Takashima, Komatsu (JP); Toshiaki Karasawa, Komatsu (JP); Masaki Kobayashi, Komatsu (JP)

(73) Assignee: Suncorona Oda Co., Ltd., Komatsu City (JP)

( * ) Notice: Subject to any disclaimer, the term of this patent is extended or adjusted under 35 U.S.C. 154(b) by 485 days.

(21) Appl. No.: 15/725,556

(22) Filed: Oct. 5, 2017

(65) Prior Publication Data

US 2018/0100043 A1 Apr. 12, 2018

(30) Foreign Application Priority Data

Oct. 7, 2016 (JP) ................................ 2016-199346
Nov. 4, 2016 (JP) ................................ 2016-216631
Jun. 2, 2017 (JP) ................................ 2017-110269

(51) Int. Cl.
*C08J 5/04* (2006.01)
*B32B 27/38* (2006.01)
(Continued)

(52) U.S. Cl.
CPC ............... *C08J 5/042* (2013.01); *B32B 27/38* (2013.01); *C08G 59/06* (2013.01); *C08G 59/245* (2013.01);
(Continued)

(58) Field of Classification Search
CPC ..... C08J 5/24; C08J 5/042; C08J 5/04; B29K 2105/0881; B29K 2105/0872;
(Continued)

(56) References Cited

U.S. PATENT DOCUMENTS

2007/0010611 A1 1/2007 Hirayama et al.
2009/0104418 A1 * 4/2009 Ohki .................... B29C 43/003 428/213
(Continued)

FOREIGN PATENT DOCUMENTS

EP 3372367 A1 * 9/2018 ............. B29C 43/02
EP 3395551 B1 * 4/2022 ........... B29B 15/122
(Continued)

OTHER PUBLICATIONS

J-plat pat translation of application No. JP2017504957, accessed on Sep. 19, 2019. (Year: 2016).*
(Continued)

*Primary Examiner* — Marla D McConnell
*Assistant Examiner* — Christine X Nisula
(74) *Attorney, Agent, or Firm* — Sughrue Mion, PLLC

(57) ABSTRACT

The present invention provides a fiber-reinforced thermoplastic resin sheet having both high strength and moldability, to provide a unidirectional prepreg from which such a fiber-reinforced thermoplastic resin sheet can be acquired, and to provide a manufacturing method of a unidirectional prepreg. The present invention relates to a unidirectional prepreg having a tape shape comprising: spread reinforcement fibers; and a polymer of a bisphenol A type epoxy compound represented by Formula (1):
(Continued)

(1)

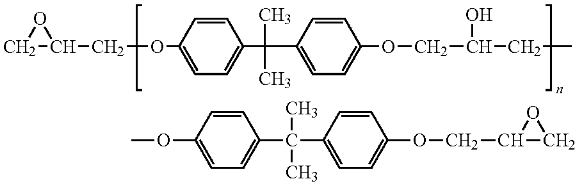

[where n is an integer of 1 to 4] and a bisphenol compound selected from the group consisting of bisphenol A, bisphenol F, bisphenol S, bisphenol B, bisphenol E, and bisphenol P, wherein the polymer has a weight-average molecular weight of 5,000 to 25,000, and wherein the average content number of the reinforcement fibers in a thickness direction of the unidirectional prepreg is ten or less.

16 Claims, 5 Drawing Sheets

(51) Int. Cl.

| | |
|---|---|
| ***C08G 59/06*** | (2006.01) |
| ***C08G 59/24*** | (2006.01) |
| ***C08G 59/62*** | (2006.01) |
| ***C08J 5/24*** | (2006.01) |
| ***C08K 3/04*** | (2006.01) |
| ***C08K 7/06*** | (2006.01) |
| ***C08L 63/00*** | (2006.01) |

(52) U.S. Cl.

CPC ............ *C08G 59/621* (2013.01); *C08J 5/243* (2021.05); *C08K 3/046* (2017.05); *C08K 7/06* (2013.01); *C08L 63/00* (2013.01); *B32B 2262/101* (2013.01); *B32B 2262/106* (2013.01); *C08J 2300/22* (2013.01); *C08J 2363/00* (2013.01); *C08J 2363/02* (2013.01); *C08K 3/04* (2013.01); *C08L 2205/16* (2013.01)

(58) Field of Classification Search

CPC ... C08L 63/00; B32B 27/38; B32B 2305/076; B32B 5/24; C09J 2363/00; Y10T 428/2971; Y10T 428/24994

See application file for complete search history.

(56) References Cited

U.S. PATENT DOCUMENTS

| | | | | |
|---|---|---|---|---|
| 2012/0135227 | A1* | 5/2012 | Kawabe | D01D 11/02 428/338 |
| 2016/0168371 | A1 | 6/2016 | Yoshida et al. | |
| 2016/0297185 | A1* | 10/2016 | Nagasaka | B32B 27/12 |
| 2016/0326323 | A1 | 11/2016 | Hayashi et al. | |
| 2017/0183465 | A1* | 6/2017 | Kawabe | C08J 5/04 |
| 2017/0232702 | A1* | 8/2017 | Hayashi | B29C 70/24 428/339 |
| 2017/0260346 | A1* | 9/2017 | Hirata | C08J 5/042 |

FOREIGN PATENT DOCUMENTS

| | | | | | |
|---|---|---|---|---|---|
| JP | 2004269600 | A | * | 9/2004 | |
| JP | 2005-239843 | A | | 9/2005 | |
| JP | 2006-321897 | A | | 11/2006 | |
| JP | 2009-143158 | A | | 7/2009 | |
| JP | 2010-270420 | A | | 12/2010 | |
| JP | 2011006833 | A | * | 1/2011 | |
| JP | 4708797 | B2 | | 6/2011 | |
| JP | 4789940 | B2 | | 10/2011 | |
| JP | 2016-011403 | A | | 1/2016 | |
| JP | 2016-113470 | A | | 6/2016 | |
| WO | 2015/105051 | A1 | | 7/2015 | |
| WO | 2016/017080 | A1 | | 2/2016 | |
| WO | WO-2016143524 | A1 | * | 9/2016 | C08J 5/04 |

OTHER PUBLICATIONS

J-plat pat translation of JP-2004269600-A, accessed on Sep. 19, 2019. (Year: 2004).*

Espacenet translation of JP-2011006833-A (Year: 2011).*

Communication dated Jan. 31, 2017, issued by the Japan Patent Office in corresponding Japanese Application No. 2016-216631.

* cited by examiner

UNIDIRECTIONAL PREPREG, FIBER-REINFORCED THERMOPLASTIC RESIN SHEET, MANUFACTURING METHODS OF UNIDIRECTIONAL PREPREG AND FIBER-REINFORCED THERMOPLASTIC RESIN SHEET, AND MOLDED BODY

TECHNICAL FIELD

This application claims priority to and the benefit of Japanese Patent Application Nos. 2016-199346, 2016-216631 and 2017-110269, filed on Oct. 7, 2016, Nov. 4, 2016 and Jun. 2, 2017 respectively, the entire contents of which are incorporated herein by reference.

The present invention relates to a unidirectional prepreg containing reinforcement fibers, a fiber-reinforced thermoplastic resin sheet, manufacturing methods of a unidirectional prepreg and a fiber-reinforced thermoplastic resin sheet, and a molded body.

BACKGROUND OF THE INVENTION

Fiber-reinforced plastic (FRP) is a composite material comprising a thermosetting resin or a thermoplastic resin as a matrix and further containing reinforcement fibers such as carbon fibers and glass fibers in the resin. The fiber-reinforced plastic comprising a thermoplastic resin as a matrix is used in a wide range of fields such as tanks, containers, ships, and automobiles.

For a method of manufacturing fiber-reinforced plastic, for example, Patent Document 1 (Japanese Laid-Open Patent Publication No. 2005-239843) describes a method in which a continuous fiber bundle is impregnated with a solution having a viscosity lowered by dilution with a solvent and the solvent is removed at the next step. Patent Document 2 (Japanese Laid-Open Patent Publication No. 2009-143158) describes a pultrusion method in which a continuous fiber bundle immersed in a molten resin is spread, squeezed, and mechanically impregnated by further applying a pressure to a resin etc. Patent Document 3 (Japanese Laid-Open Patent Publication No. 2016-11403) describes a manufacturing method of a fiber-reinforced composite material in which a reinforcement fiber bundle impregnated with a thermoplastic resin is solidified while being supported by two supporting members separated from each other at a distance calculated with a predetermined equation. In recent years, for example, as described in Patent Document 4 (Japanese Patent No. 4708797), a method using a mixture of an uncured thermoplastic resin and reinforcement fibers is proposed as a manufacturing method of fiber-reinforced thermoplastic.

Furthermore, Patent Document 5 (Japanese Patent No. 4789940) describes a fiber-reinforced thermoplastic resin sheet molded by heating and pressurizing a laminate acquired by laminating prepregs made of a thermoplastic resin and reinforcement fibers and having predetermined fiber volume fraction, length in a fiber axis direction, and thickness such that the fiber orientation becomes random. Patent Document 6 (Japanese Laid-Open Patent Publication No. 2016-113470) describes a matrix material containing a matrix resin composed of both a first epoxy resin and a second epoxy resin or only the first epoxy resin, and a third epoxy resin, the matrix resin having a predetermined average epoxy equivalent, considered as having a favorable adhesiveness to carbon fibers.

PRIOR ART DOCUMENT

Patent Document

Patent Document 1: Japanese Laid-Open Patent Publication No. 2005-239843

Patent Document 2: Japanese Laid-Open Patent Publication No. 2009-143158

Patent Document 3: Japanese Laid-Open Patent Publication No. 2016-11403

Patent Document 4: Japanese Patent No. 4708797

Patent Document 5: Japanese Patent No. 4789940

Patent Document 6: Japanese Laid-Open Patent Publication No. 2016-113470

SUMMARY OF THE INVENTION

Although the various manufacturing methods have been proposed for fiber-reinforced plastic, a demand still exists for increasing the moldability and strength of the fiber-reinforced plastic. Therefore, a problem to be solved by the present invention is to provide a fiber-reinforced thermoplastic resin sheet having both high strength and moldability, to provide a unidirectional prepreg from which such a fiber-reinforced thermoplastic resin sheet can be acquired, and to provide a manufacturing method thereof.

The present inventors focused attention on the fact that the presence of gaps (voids) not impregnated with a matrix resin between reinforcement fibers deteriorates mechanical characteristics of a finally acquired molded body and that the inclusion of a thick reinforcement fiber bundle makes the fiber orientation locally excessive and prevents stress transmission through fibers in a direction different from a fiber axis direction, which makes it unable to fully utilize the actual strength of the fibers, and conducted studies on a unidirectional prepreg for acquiring a fiber-reinforced thermoplastic resin sheet. Consequently, the present inventors found that the object can be achieved by a unidirectional prepreg and a fiber-reinforced thermoplastic resin sheet of the present invention described below.

Therefore, the present invention includes the following preferred aspects.

[1] A unidirectional prepreg having a tape shape comprising: spread reinforcement fibers; and a polymer of a bisphenol A type epoxy compound represented by Formula (1):

(1)

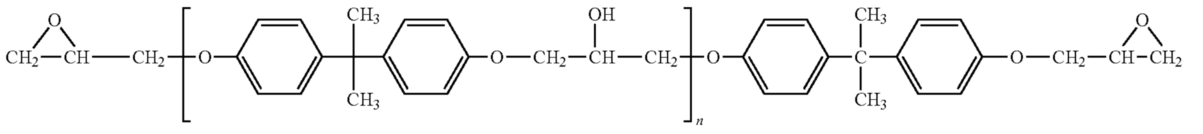

[where n is an integer of 1 to 4]

and a bisphenol compound selected from the group consisting of bisphenol A, bisphenol F, bisphenol S, bisphenol B, bisphenol E, and bisphenol P, wherein the polymer has a weight-average molecular weight of 5,000 to 25,000, and wherein the average content number of the reinforcement fibers in a thickness direction of the unidirectional prepreg is ten or less.

[2] The unidirectional prepreg according to [1], wherein the average content density of the reinforcement fibers in the width direction of the unidirectional prepreg is 150 to 2000 fibers/mm when calculated by following Formula (2):

[Mathematical 1]

average content density [fibers/mm] of reinforcement fibers in the width direction=(average content number [fibers] of reinforcement fibers in the width direction)×(1/single yarn diameter [mm] of reinforcement fibers) (2).

[3] The unidirectional prepreg according to [1] or [2], comprising 2 to 3 parts by mass of an organophosphorous compound based on 100 parts by mass of a thermoplastic resin.

unidirectional prepregs per unit thickness of the fiber-reinforced thermoplastic resin sheet is 10 to 40 layers/mm.

[10] The fiber-reinforced thermoplastic resin sheet according to any of [6] to [9], wherein the sheet has a water absorption of 1 wt % or less when measured according to JIS K 7209.

[11] The fiber-reinforced thermoplastic resin sheet according to any of [6] to [10], wherein the sheet has a void fraction of 1 vol % or less when measured according to JIS-7075.

[12] A molded body comprising: a random laminated body of the unidirectional prepreg(s) according to any of [1] to [5] or comprising: the fiber-reinforced thermoplastic resin sheet according to any of [6] to [11].

[13] A manufacturing method of a unidirectional prepreg comprising at least the steps of:

(a) opening reinforcement fibers until the average content number in a thickness direction becomes ten or less;

(b) impregnating spread reinforcement fibers with a bisphenol A type epoxy compound represented by Formula (1):

(1)

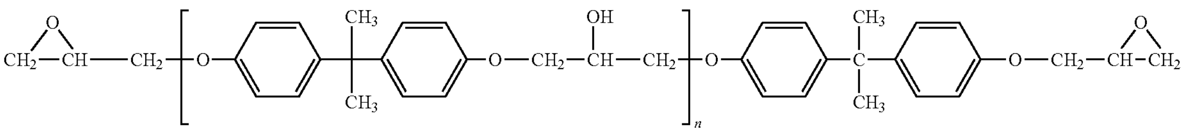

[where n is an integer of 1 to 4]

and a bisphenol compound selected from the group consisting of bisphenol A, bisphenol F, bisphenol S, bisphenol B, bisphenol E, and bisphenol P; and (c) heating the reinforcement fibers impregnated with the compounds to polymerize the compound contained in the reinforcement fibers until the weight-average molecular weight of an acquired polymer becomes 5,000 to 25,000, wherein the average content number of reinforcement fibers in the thickness direction of the unidirectional prepreg is ten or less.

[4] The unidirectional prepreg according to any of [1] to [3], wherein the reinforcement fibers are carbon fibers.

[5] The unidirectional prepreg according to any of [1] to [4], wherein a coefficient of variation of width of the unidirectional prepreg is 20% or less.

[6] A fiber-reinforced thermoplastic resin sheet containing spread reinforcement fibers and a thermoplastic resin and made up of a random laminated body of unidirectional prepregs, wherein the average content number of reinforcement fibers in a thickness direction of the unidirectional prepreg is ten or less, wherein the thermoplastic resin is a polymer of a bisphenol A type epoxy compound represented by Formula (1):

(1)

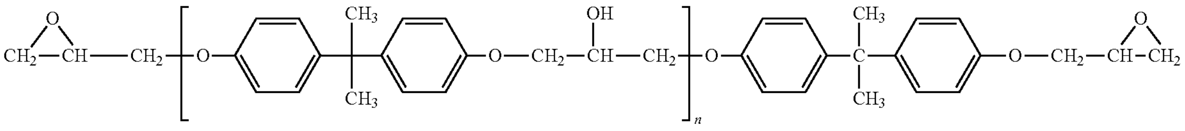

[where n is an integer of 1 to 4]

and a bisphenol compound selected from the group consisting of bisphenol A, bisphenol F, bisphenol S, bisphenol B, bisphenol E, and bisphenol P, and wherein the polymer has a weight-average molecular weight of 30,000 or more.

[7] The fiber-reinforced thermoplastic resin sheet according to [6], wherein the unidirectional prepreg has a length of 10 to 50 mm in the fiber direction.

[8] The fiber-reinforced thermoplastic resin sheet according to [6] or [7], wherein the reinforcement fibers are carbon fibers.

[9] The fiber-reinforced thermoplastic resin sheet according to any of [6] to [8], wherein the number of layers of the

[14] The manufacturing method according to [13], wherein at step (b), the bisphenol A type epoxy compound and the bisphenol compound are impregnated at a mass ratio of 50:50 to 90:10.

[15] A manufacturing method of a fiber-reinforced thermoplastic resin sheet at least comprising:

(1) a step of randomly laminating tape-shaped unidirectional prepregs containing spread reinforcement fibers and a thermoplastic resin to acquire a laminate, wherein the thermoplastic resin is a polymer of a bisphenol A type epoxy compound represented by Formula (1):

(1)

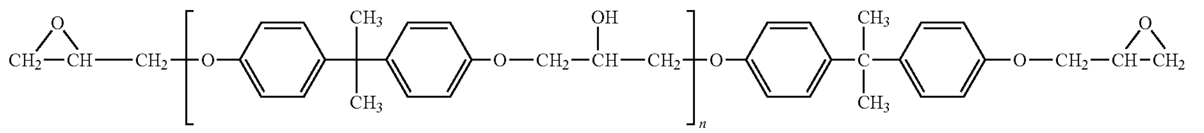

[where n is an integer of 1 to 4]
and a bisphenol compound selected from the group consisting of bisphenol A, bisphenol F, bisphenol S, bisphenol B, bisphenol E, and bisphenol P, wherein the weight-average molecular weight of the polymer is 5,000 to 25,000, and <Unidirectional Prepreg>

A unidirectional prepreg of the present invention is a tape-shaped unidirectional prepreg containing spread reinforcement fibers and a polymer of a bisphenol A type epoxy compound represented by Formula (1):

(1)

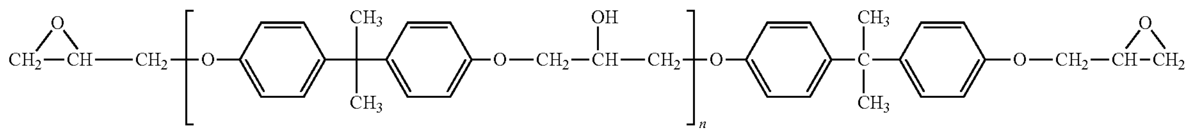

wherein the average content number of the reinforcement fibers in the thickness direction of the unidirectional prepregs is ten or less;
and (2) a step of heating the laminate at a temperature of 100 to 200° C.

By using the unidirectional prepreg of the present invention, a fiber-reinforced thermoplastic resin sheet excellent in moldability and strength can be acquired. The thermoplastic resin sheet of the present invention is excellent in moldability and strength.

DETAILED DESCRIPTION OF THE PREFERRED EMBODIMENTS

Figure 1:
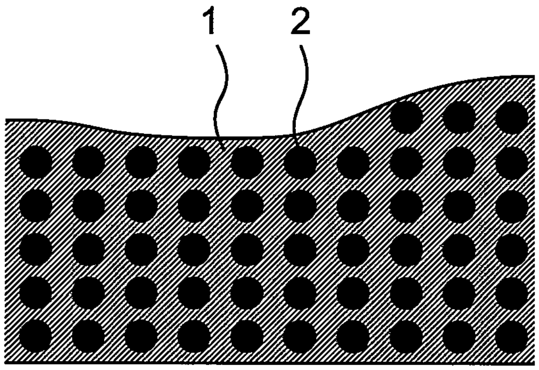
FIG. 1 is a schematic of a cross section of a unidirectional prepreg of the present invention.

Embodiments of the present invention will now be described in detail. The scope of the present invention is not limited to the embodiments in this description and various modification can be made without departing from the spirit of the present invention.

[where n is an integer of 1 to 4]
and a bisphenol compound selected from the group consisting of bisphenol A, bisphenol F, bisphenol S, bisphenol B, bisphenol E, and bisphenol P, wherein the polymer has a weight-average molecular weight of 5,000 to 25,000, and wherein the average content number of the reinforcement fibers in a thickness direction of the unidirectional prepreg is ten or less. In the unidirectional prepreg of the present invention, since the average content number of the reinforcement fibers in the thickness direction is ten or less and the polymer having a weight-average molecular weight of 5,000 to 25,000 is contained, the reinforcement fibers are present without containing a void etc. in a resin matrix. Therefore, a fiber-reinforced thermoplastic resin sheet acquired by using the unidirectional prepreg of the present invention has both high moldability and strength.

The polymer having a weight-average molecular weight of 5,000 to 25,000 contained in the unidirectional prepreg of the present invention is an in-situ polymerization type thermoplastic resin. The polymer serving as the thermoplastic resin contained in the unidirectional prepreg of the present invention will hereinafter also referred to as a "thermoplastic resin A". The bisphenol A type epoxy compound represented by Formula (1) used as raw material of the thermoplastic resin A and a thermoplastic resin B described later and the bisphenol compound selected from the specific group are hereinafter collectively referred to as "raw material compounds". In this description, the in-situ polymerization type thermoplastic resin means that the polymer contained in the spread reinforcement fibers is further polymerized by heating etc. into a polymer having a higher molecular weight. For example, the unidirectional prepreg of the present invention can be manufactured by impregnating a tow of reinforcement fibers serving as raw materials aligned and spread in one direction with the raw material compounds of the in-situ polymerization type thermoplastic resin and subsequently solidifying the raw material compounds.

The polymer contained in the unidirectional prepreg of the present invention is an in-situ polymerization type thermoplastic resin and is a polymer acquired by using the bisphenol A type epoxy compound represented by Formula (1):

(1)

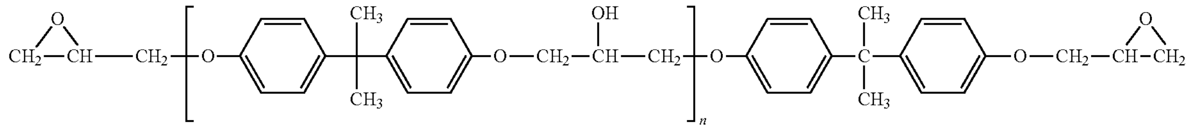

[where n is an integer of 1 to 4]
and the bisphenol compound selected from the group consisting of bisphenol A, bisphenol F, bisphenol S, bisphenol B, bisphenol E, and bisphenol P as raw materials.

Examples of the reinforcement fiber contained in the unidirectional prepreg of the present invention include organic fibers such as aramid fibers, polyethylene fibers, and polyparaphenylene benzoxazole (PBO) fibers; inorganic fibers such as glass fibers, carbon fibers, silicon carbide fibers, alumina fibers, tyranno fibers, basalt fibers, and ceramic fibers; metal fibers such as stainless steel fibers and steel fibers; other reinforcement fibers using boron fibers, natural fibers, modified natural fibers as fibers, etc. These reinforcement fibers are preferably reinforcement fibers made up of several thousand or more filaments, and reinforcement fibers made up of 3000 to 60000 filaments are preferably used for manufacturing the unidirectional prepreg. If the unidirectional prepreg of the present invention is used as a molded body, the reinforcement fibers are more preferably carbon fibers from the viewpoint of the strength and rigidity of the molded body. The unidirectional prepreg of the present invention may contain one type of reinforcement fibers or may contain a combination of two or more types of reinforcement fibers.

In a preferred aspect of the unidirectional prepreg of the present invention having the reinforcement fibers that are carbon fibers, the carbon fibers may be pitch-based carbon fibers or PAN-based carbon fibers. From the viewpoint of handleability, the carbon fibers are preferably the PAN-based carbon fibers.

Although the presence or absence of twist in the reinforcement fiber is not particularly limited, the reinforcement fibers with less twist or without twist are preferable from the viewpoint of facilitating infiltration of a matrix resin. From the same viewpoint, the number of twists of the reinforcement fibers is preferably 1 twist/m or less, more preferably 0.5 twist/m or less, still more preferably 0.3 twist/m or less.

When the reinforcement fibers are carbon fibers, the carbon fibers are often wound around a bobbin that is a cylindrical tube having constant traverse width. A filament diameter of one carbon fiber is usually 5 to 8 μm, and a plurality of carbon fibers having a predetermined filament number (specifically 1000 (1K), 3000 (3K), 6000 (6K), 12000 (12K), 15000 (15K), 18000 (18K), 24000 (24K), 30000 (30K), 60000 (60K)) is bundled together into a flat shape and preferably used as a fiber bundle (carbon fiber tow). Although the filament number of the carbon fibers may appropriately be changed depending on desired width and thickness of the spread carbon fibers or the unidirectional prepreg of the present invention, the number is preferably 3000 to 60000, more preferably 6000 to 24000, from the viewpoint of productivity. The filament number equal to or less than the upper limit is preferable since voids can be restrained from occurring within a prepreg to be manufactured. The filament number equal to or greater than the lower limit is preferable since fluffing due to single yarn breakage at the time of opening and cracking of the prepreg can be suppressed.

The unidirectional prepreg of the present invention is a prepreg containing spread reinforcement fibers such that the fibers have unidirectionality. In the present invention, the unidirectionality of the fibers contained in the prepreg can be evaluated as follows. First, a middle point of width is obtained at each of both cut end portions of the prepreg cut to a predetermined length in the fiber direction (e.g., 150 mm in the fiber direction), and the middle point of one end portion and the middle point of the other end portion are connected to define this line as a reference line. On one side of the prepreg relative to the reference line, a length in the width direction (a length that is about a half of the width, hereinafter also referred to as a "half width") is measured at least at ten positions along the fiber direction. When a coefficient of variation calculated from an average value of the half width acquired at least at ten positions and a standard deviation is preferably 10% or less, more preferably 9% or less, further preferably 7% or less, particularly preferably 5% or less, the unidirectional prepreg of the present invention can be considered as having unidirectionality.

The unidirectional prepreg of the present invention includes spread reinforcement fibers. With regard to the spread reinforcement fibers contained in the unidirectional prepreg of the present invention, the average content number of reinforcement fibers in the thickness direction is ten or less. If the average content number in the thickness direction is more than ten, too much reinforcement fibers are overlapped in the thickness direction, so that the fibers cannot be sufficiently uniformly impregnated with the compounds serving as the raw materials of the polymer contained in the unidirectional prepreg (the bisphenol A type epoxy compound represented by Formula (1) and the bisphenol compound), and a gap (void) not impregnated with the resin is generated between the fibers. If a void is contained in the prepreg, this void remains in the molded body molded, for example, through a random laminated body from the prepregs, making it unable to acquire sufficient strength of the molded body. Alternatively, for achieving sufficient strength of the molded body, severe conditions such as applying high temperature and/or high pressure or applying a long press time are required so as to remove the voids at steps of manufacturing the random laminated body (fiber-reinforced thermoplastic resin sheet) and the molded body from the prepregs. Such severe conditions result in a deterioration of the resin and a reduction in production efficiency and therefore are not preferable. Additionally, the fiber orientation becomes locally excessive and prevents stress transmission through the fibers in a direction different from the fiber axis direction, which makes it unable to fully utilize the actual strength of the fibers.

From the viewpoint of facilitating infiltration of the raw material compounds and easily increasing the strength of the random laminated body of the unidirectional prepregs of the present invention, the upper limit of the average content number in the thickness direction is preferably eight or less, more preferably seven or less, still more preferably six or less. The lower limit value of the average content number in the thickness direction is preferably made as small as possible from the viewpoint of facilitating the infiltration of the resin and, although not particularly limited, the value is preferably one or more, more preferably two or more, still more preferably three or more, from production viewpoint.

When the spread reinforcement fibers have the configuration described above, the average content number of reinforcement fibers in the thickness direction of the unidirectional prepreg of the present invention can be ten or less. Similarly, the average content number of reinforcement fibers in the thickness direction of the unidirectional prepreg of the present invention is preferably eight or less, more preferably seven or less, still more preferably six or less, particularly preferably 5.5 or less. The lower limit value of the average content number in the thickness direction is preferably one or more, more preferably two or more, still more preferably three or more, from production viewpoint.

When the number of reinforcement fibers contained in the thickness direction in the unidirectional prepreg of the present invention is measured, a cross section acquired by cutting the prepreg in the thickness direction is embedded by a resin etc. and observed with an electron microscope etc., to count the number of fibers present in the thickness direction in the acquired image. In this way, the number of fibers present in the thickness direction is counted in cross-sectional images at least at five positions, and the average value is used as the average content number of reinforcement fibers in the thickness direction. To minimize the influence of an external force on the prepreg during cutting in the cross-sectional observation, for example, the prepreg may be cut while both surfaces thereof are sandwiched and fixed by rigid plates of metal etc., before performing the cross-sectional observation. For the measurement of at least five positions, if the unidirectional prepreg of the present invention has a certain length (e.g., in the case of a tape-shaped form wound around a bobbin), the measurement may be performed at least at five positions at intervals of about 50 cm in the fiber axis direction or, if the unidirectional prepreg of the present invention is in the form of a cut tape, at least five prepregs may arbitrarily be taken out from a plurality of cut prepregs for the measurement. Hereinafter, when the measurement is performed at a plurality of positions, the plurality of positions may be measured in the same way as described above.

The coefficient of variation (CV value) of the number of reinforcement fibers contained in the thickness direction in the unidirectional prepreg of the present invention is preferably 20% or less, more preferably 10% or less, further preferably 5% or less. In the present invention, by measuring the number of reinforcement fibers contained in the thickness direction of the spread reinforcement fibers contained in each unidirectional prepreg at least at ten positions, the coefficient of variation is calculated from the average value and the standard deviation acquired from the results with the equation of the coefficient of variation (CV value)=standard deviation/average value×100(%). When the coefficient of variation of the number of contained reinforcement fibers in the thickness direction is not more than the upper limit, a lamination unevenness hardly occurs when the random laminated body is manufactured from the prepregs of the present invention, and the isotropy of the fiber-reinforced thermoplastic resin sheet of the present invention is easily ensured.

For the spread reinforcement fibers contained in the unidirectional prepreg of the present invention, an average content density (hereinafter also referred to as an "average content density A") of the reinforcement fibers in the width direction calculated from following Eq. (2) is preferably 150 to 2000 fibers/mm, more preferably 500 to 1500 fibers/mm, still more preferably 700 to 1000 fibers/mm. When the average content density of the reinforcement fibers in the width direction is not more than the upper limit, voids are hardly generated within the prepreg at the time of impregnation and subsequent solidification of the raw material compounds, and the fiber-reinforced thermoplastic resin sheet manufactured from this unidirectional prepreg is easily increased in mechanical strength. When the average content density of the reinforcement fibers in the width direction is not less than the lower limit, the prepreg is easily prevented from cracking, and the fiber-reinforced thermoplastic resin sheet of the present invention is easily increased in strength.

By setting the average content density in the width direction per unidirectional prepreg within the range, the unidirectional prepreg hardly cracks regardless of a thin layer, and voids are easily reduced. By manufacturing the fiber-reinforced thermoplastic resin sheet of the present invention by using such a unidirectional prepreg, the moldability and strength for a sheet are easily enhanced, and the molded body manufactured from the fiber-reinforced thermoplastic resin sheet of the present invention is easily improved in quality.

The average content density of the reinforcement fibers in the width direction is calculated from following Eq. (2). The method of measuring the average content number of reinforcement fibers in the thickness direction in Eq. (2) is as described above. In Eq. (2), (1/single yarn diameter [mm] of reinforcement fibers) represents the number of reinforcement fibers containable in a unit lamination layer per 1 mm in the width direction.

Average content density [fibers/mm] of reinforcement fibers in the width direction=(average content number [fibers] of reinforcement fibers in the width direction)×(1/single yarn diameter [mm] of reinforcement fibers) (2)

The average content density A calculated from Eq. (2) will hereinafter be described. In the prepreg of the present invention, the reinforcement fibers are laminated in the thickness direction and are arranged in the width direction. The (1/single yarn diameter [mm] of reinforcement fibers) represents the number of reinforcement fibers containable in a unit lamination layer per 1 mm in the width direction, i.e., the number of reinforcement fibers containable in one layer in the thickness direction having the length of 1 mm in the width direction (in the unit lamination layer). This numerical value is a numerical value indicative of to what extent the fibers are containable in the unit lamination layer, i.e., 1 mm in the width direction×one layer in the thickness direction, and is therefore calculated by dividing 1 mm by the single yarn diameter of reinforcement fibers. As represented by Eq. (2), the average content density of the reinforcement fibers in the width direction is the product of the (1/single yarn diameter [mm] of reinforcement fibers) calculated as described above and the average content number of reinforcement fibers in the thickness direction and represents the average content number of reinforcement fibers containable per unit width (1 mm) of the prepreg of the present invention. Specifically, because of being calculated by multiplying the number of reinforcement fibers containable in one layer in the thickness direction having the length of 1 mm in the width direction (in the unit lamination layer) by the average content number of reinforcement fibers in the thickness direction, the density represents the number of reinforcement fibers containable in a rectangular range having 1 mm in the width direction×a length of the thickness in the thickness direction in the cross section in the thickness direction orthogonal to the fiber direction of the prepreg of the present invention.

In the unidirectional prepreg of the present invention, when it is assumed that the number of reinforcement fibers contained in the unidirectional prepreg is m (fibers), that the average content number in the thickness direction is n (fibers), that the average width of the unidirectional prepreg is p (mm), and that the single yarn diameter of reinforcement fibers is q (mm), preferably, m, n, p, and q satisfy following Eq. (3):

$$0.7 \le \frac{\{(m/n)/p\}}{(1/q)} \le 1.3. \qquad (3)$$

In the unidirectional prepreg of the present invention, preferably, the reinforcement fibers arranged in the width direction are impregnated with the polymer between the fibers such that the fibers are present at certain intervals. Eq. (3) is an equation representative of the sparseness/denseness of reinforcement fibers in the width direction in the unidirectional prepreg of the present invention. First, the value calculated by (m/n) in Eq. (3) is a value acquired by dividing the number (m) of reinforcement fibers contained in the unidirectional prepreg by the average content number (n) in the thickness direction and represents the number of reinforcement fibers actually contained in the range of the average width in the width direction×one layer in the thickness direction of the unidirectional prepreg. This value is further divided by the average width (p) of the unidirectional prepreg to calculate the number of reinforcement fibers actually contained in the range of 1 mm in the width direction×one layer in the thickness direction as (m/n)/p. By dividing (m/n)/p by 1/q, a parameter representative of the sparseness/denseness of reinforcement fibers in the width direction is calculated as {(m/n)/p}/(1/q) (hereinafter also referred to as "value X"). For example, when the value X is one, i.e., when (m/n)/p is equal to 1/q, this means that the reinforcement fibers are arranged in the width direction without a gap and, as the value X becomes smaller than one, i.e., as (m/n)/p becomes smaller than (1/q), this means that the intervals between the reinforcement fibers arranged in the width direction becomes larger. From the viewpoint of facilitating uniform presence of the resin and fibers in the prepreg and the viewpoint of facilitating prevention of cracking of the unidirectional prepreg, the value X is preferably 0.7 or more, more preferably 0.8 or more, still more preferably 0.9 or more. From the viewpoint of suppressing variation in strength of the fiber-reinforced thermoplastic resin sheet, the value X is preferably 1.3 or less, more preferably 1.2 or less, still more preferably 1.1 or less.

The coefficient of variation (CV value) of width of the spread reinforcement fibers contained in the unidirectional prepreg of the present invention is preferably 20% or less, more preferably 10% or less, further preferably 5% or less. In the present invention, the length of the width substantially orthogonal to the fiber direction of the spread reinforcement fibers is measured at least at ten positions to calculate the coefficient of variation from the average value and the standard deviation acquired from the results with the equation of the coefficient of variation (CV value)=standard deviation/average value×100(%). When the spread reinforcement fibers have the configuration described above, the coefficient of variation of width in the unidirectional prepreg of the present invention can preferably be set to 5% or less. When the coefficient of variation of width is not more than the upper limit, a lamination unevenness hardly occurs when the random laminated body is manufactured from the prepregs of the present invention, and the isotropy of the fiber-reinforced thermoplastic resin sheet of the present invention is easily ensured.

Figure 2:
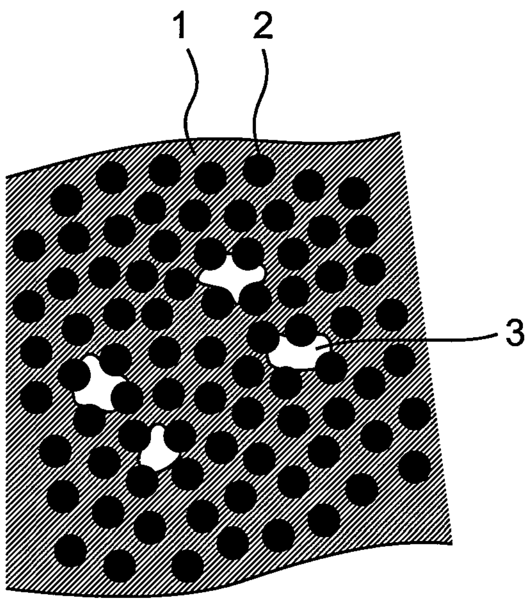
FIG. 2 is a schematic of a cross section of a unidirectional prepreg not according to the present invention.

A preferred embodiment of the unidirectional prepreg of the present invention will be described with reference to the figures. FIG. 1 is a schematic of a cross section acquired by cutting in the thickness direction a unidirectional prepreg in a preferable embodiment of the present invention having the average content number of reinforcement fibers in the thickness direction equal to or less than ten. FIG. 2 is a schematic of a cross section acquired by cutting in the thickness direction a unidirectional prepreg having the average content number of reinforcement fibers in the thickness direction larger than ten not corresponding to the present invention.

In FIG. 1 showing a preferred embodiment of the present invention, reinforcement fibers 2 have an in-situ polymerization type thermoplastic resin (matrix resin 1) that is a polymer of the bisphenol A type epoxy compound and the bisphenol compound sufficiently infiltrating therebetween; however, in FIG. 2 showing an embodiment not corresponding to the present invention, the matrix resin 1 has not sufficiently infiltrated between the reinforcement fibers 2 so that voids 3 are present. This difference affects the moldability at the time of manufacturing a final molded product and the strength of the acquired molded product. It is noted that FIG. 1 is a schematic of an embodiment of the unidirectional prepreg of the present invention and is not intended to limit the cross-sectional shape of the unidirectional prepreg of the present invention.

The unidirectional prepreg of the present invention contains a polymer of the bisphenol A type epoxy compound represented by Formula (1):

(1)

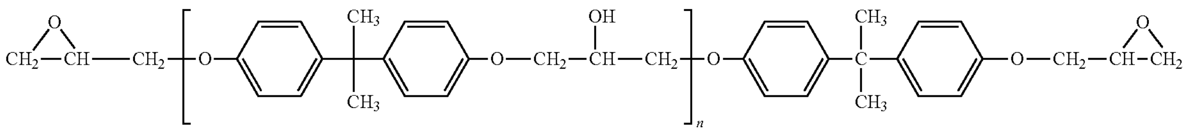

[where n is an integer of 1 to 4]

and the bisphenol compound selected from the group consisting of bisphenol A, bisphenol F, bisphenol S, bisphenol B, bisphenol E, and bisphenol P. The polymer has a weight-average molecular weight of 5,000 to 25,000. Therefore, the handleability during tape production is preferable, and furthermore, the moldability and formativeness of the fiber-reinforced thermoplastic sheet manufactured by using this tape can be enhanced. The weight-average molecular weight of the polymer is preferably 7,000 to 20,000, more preferably 7,000 to 15,000, from the viewpoint of productivity and moldability. The weight-average molecular weight is measured by a device using gel permeation chromatography (GPC). The weight-average molecular weight equal to or greater than the lower limit is preferable from the viewpoint of the handleability of the unidirectional prepreg, and the weight-average molecular weight equal to or less than the upper limit is preferable since the fluidity of the resin becomes favorable at the time of manufacturing the random laminated body and the molded body with a low void fraction and sufficient strength can be manufactured. The polymer having the weight-average molecular weight described above is a linear polymer in which the bisphenol A type epoxy compound and the bisphenol compound are linearly polymerized via a reactive group (epoxy group) at the terminal of the bisphenol A type epoxy compound represented by Formula (1) and a phenol group of the bisphenol compound having two phenolic hydroxyl groups. The polymer has thermoplasticity because of having such a structure. The polymer having the weight-average molecular weight is an in-situ polymerization type polymer, and the polymer is further polymerized at a step of manufacturing a thermoplastic resin sheet from a unidirectional prepreg and/or a step of manufacturing a molded body from the thermoplastic resin sheet. Specifically, for example, polymerization further progresses between the polymer and the bisphenol compound still contained in the unidirectional prepreg. This facilitates the enhancement in the strength of the thermoplastic resin sheet, the moldability at the time of manufacturing the final molded product, the strength of the molded product, etc.

The polymer contained in the unidirectional prepreg of the present invention is a polymer of a bisphenol A type epoxy compound and a bisphenol compound used as raw materials, and the weight-average molecular weight of the bisphenol A type epoxy compound used as raw material before polymerization is 2000 or less.

The bisphenol A type epoxy compound is manufactured by a condensation reaction of bisphenol A and epichlorohydrin. Conventionally, a bisphenol A type epoxy resin is a typical resin as a thermosetting type synthetic resin and is three-dimensionally cured by reaction with various curative agents, so that cured resins having various characteristics can be acquired. On the other hand, as shown in Formula (1), the bisphenol A type epoxy compound used in the present invention has epoxy groups serving as functional groups only at both ends of the molecular chain, and a repeating unit n of the molecular chain is one to four. When n is one to four, the weight-average molecular weight of the bisphenol A type epoxy compound is 594 to 1416. Bisphenol A is one of the bisphenol compounds used as raw materials, is synthesized by a reaction of phenol and acetone, and has a structure represented by Formula (4):

(4)

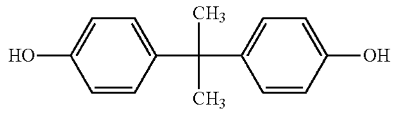

As shown in the formula, the phenolic hydroxyl groups serving as the functional groups are included at both ends of the molecule, and the weight-average molecular weight is 228. The other bisphenol compounds in the present invention, i.e., bisphenol F, bisphenol S, bisphenol B, bisphenol E, and bisphenol P, all have phenolic hydroxyl groups serving as the functional groups at both ends of the molecule and the weight-average molecular weight of 200 to 346. By using the raw materials having a low molecular weight as described above, the raw material compounds easily infiltrate between the spread reinforcement fibers at the time of manufacturing the prepreg, and the acquired prepreg is uniformly impregnated (fully impregnated) with the resin without containing voids between the fibers. From the same viewpoint, preferably, the raw material compounds are polymerized after the fibers are impregnated at the prepreg manufacturing step.

The functional group of the bisphenol A type epoxy compound represented by Formula (1) used as raw material is an epoxy group, and the functional group of the bisphenol compound as represented by Formula (4) is a phenolic hydroxyl group, for example. Therefore, the polymerization reaction of these groups sequentially progresses due to an electrophilic substitution reaction between the epoxy group in Formula (1) and the phenolic hydroxyl group in Formula (4). Since both compounds have functional groups present at both ends, for example, at the time of impregnation/solidification of a mixture of raw material compounds in spread reinforcement fibers at a raw material impregnation step/sheet manufacturing step and at the time of heating/press-molding of the random laminated body, an acquired polymer has a linear shape. Consequently, the polymer of the raw material compounds contained in the unidirectional prepreg and the fiber-reinforced thermoplastic resin sheet of the present invention has a thermoplastic property.

Such a polymer is excellent in handleability at the manufacturing step of the unidirectional prepreg. Specifically, the polymerization of the bisphenol A type epoxy compound and the bisphenol compound serving as raw materials sequentially progresses through the prepreg and sheet manufacturing steps. This reaction is an irreversible reaction, and no side product is eliminated as in a condensation reaction (e.g., dehydration reaction). Therefore, prepregs and sheets can be manufactured by using equipment of an open system. Additionally, since the raw material compounds used for manufacturing the prepreg have low molecular weight and low viscosity, the fibers can easily be impregnated with these raw materials even at room temperature. Furthermore, since the impregnation is easily achieved, a tension applied to the reinforcement fibers can be suppressed at the prepreg manufacturing step described later, so that the fluffing and breakage of the fibers can be prevented so as to gently process the fibers and stabilize the quality of the prepreg. If the unidirectional prepreg is manufactured by impregnation with a resin having a high molecular weight, it is difficult to sufficiently impregnate the fibers because of high viscosity of the resin and voids tend to remain within the prepreg, causing a reduction in strength in the sheet physical properties. Additionally, an amount of containable resin is limited, resulting in a lack of versatility in prepreg manufacture.

The polymer acquired by the polymerization reaction of the bisphenol A type epoxy compound and the bisphenol compound contained in the unidirectional prepreg of the present invention is an in-situ polymerization type thermoplastic resin and is an amorphous resin. Therefore, the polymer has a small volume contraction rate in molding and an excellent surface transfer property for a die.

The unidirectional prepreg of the present invention may contain arbitrary additives other than those above. Examples of the additives include an organic solvent, a reaction accelerator, a coupling agent, a curative agent (reaction accelerator), a pigment, an antifoaming agent, a fungicide, a deterioration preventive agent, etc. When these additives are added, the amounts thereof may appropriately be changed depending on a purpose of addition etc. For example, a reaction accelerator may be used for accelerating the polymerization reaction of the raw material compounds. The bisphenol A type epoxy compound and the bisphenol compound serving as the raw material compounds are sequentially polymerized due to the electrophilic substitution reaction as described above. Therefore, when these compounds are polymerized, it is preferable to use a basic phosphorus-based or amine-based reaction accelerator facilitating progress of the electrophilic substitution reaction, and it is particularly preferable to use an organophosphorus compound from the viewpoint of production speed.

Example of the preferably utilized organophosphorus compound include triphenylphosphine, tri-p-tolylphosphine, diphenylcyclohexylphosphine, tricyclohexylphosphine, ethyltriphenylphosphonium bromide, benzyltriphenylphosphonium chloride, 1,4-bisdiphenylphosphinobutanone, etc.

From the viewpoint of setting the weight-average molecular weight of the polymer of the raw material compounds within the preferable range, for example, from the viewpoint of easily setting the weight-average molecular weight to 5,000 to 25,000 in the unidirectional prepreg and to 30,000 or more in the fiber-reinforced thermoplastic resin sheet, the reaction accelerator is preferably used in an amount of 2 to 3 parts by mass based on 100 parts by mass of the polymer contained in the unidirectional prepreg.

The unidirectional prepreg of the present invention is in a tape shape. The tape-shaped prepreg may be in a form wound around a bobbin or may be in a form cut to a predetermined length.

A fiber volume fraction (Vf) of the unidirectional prepreg is preferably 10 to 80%, more preferably 20 to 60%, further preferably 35 to 55%, particularly preferably 25 to 45%. The fiber volume fraction (Vf) is measured according to JIS-7075, for example. The fiber volume fraction equal to or less than the upper limit is preferable since entangling positions (non-impregnated portions) between the fibers are reduced to facilitate a voidless state. The fiber volume fraction equal to or less than the lower limit is preferable since the strength of the molded body can easily be increased.

The average thickness of the unidirectional prepreg of the present invention is preferably 10 to 200 μm, more preferably 20 to 180 μm, still more preferably 40 to 160 μm. The average thickness equal to or less than the upper limit described above is preferable since the voids can be restrained from occurring within the prepreg. The average thickness equal to or more than the lower limit is preferable since the prepreg can be restrained from cracking. The average thickness is an average value acquired by measuring the prepreg at least at ten positions with a thickness meter.

Considering the average content density and the thickness of the spread reinforcement fibers described above, the average width of the unidirectional prepreg of the present invention is preferably 10 to 18 mm, for example, when 12K carbon fiber raw yarn is used. The average width is an average value acquired by measuring the width of the prepreg at least at ten positions by using a measuring camera etc. In the unidirectional prepreg of the present invention, the width direction is a direction orthogonal to the fiber direction on the prepreg surface. In this case, setting the average width to 10 mm or more facilitates the suppression of occurrence of voids within the prepreg to be manufactured, and setting the average width to 18 mm or less facilitates the suppression of fluffing due to single yarn breakage at the time of opening and cracking of the prepreg.

The average length in the fiber direction of the unidirectional prepreg of the present invention is not particularly limited. The average length is appropriately changed depending on the intended use of the unidirectional prepreg.

The unidirectional prepreg of the present invention preferably has a void fraction of 0 to 0.4 vol % when measured according to JIS-7075 in a fiber-reinforced thermoplastic sheet having an average thickness of 2 mm, from the viewpoint of easily increasing the moldability and the mechanical strength of the finally acquired molded body.

In the unidirectional prepreg of the present invention, a restraining agent may be applied to the spread reinforcement fibers. The adhesion of the restraining agent makes it easier to enhance the restraint of the width of the spread reinforcement fibers and can suppress cracking that may occur at the time of manufacturing the unidirectional prepreg of the present invention. The adhesion amount of the restraining agent is preferably 0 to 0.8% by weight, more preferably 0.3 to 0.5% by weight, based on the weight of the reinforcement fibers in consideration of the influence on deterioration of the physical properties of the finally acquired prepreg. The adhesion amount of the restraining agent equal to or greater than the upper limit is preferable since the restraint of width of the spread reinforcement fibers can be enhanced. Setting the adhesion amount of the restraining agent within the range can suppress deterioration of the physical properties of the molded body acquired from the prepreg and the cracking that may occur at the time of manufacturing the unidirectional prepreg. Although the type of the restraining agent used is not particularly limited, an emulsified epoxy resin, an emulsified modified polyolefin resin, etc. are preferably utilized.

<Fiber-Reinforced Thermoplastic Resin Sheet>

The fiber-reinforced thermoplastic resin sheet of the present invention is a random laminated body of unidirectional prepregs and contains spread reinforcement fibers and a thermoplastic resin. The thermoplastic resin contained in the fiber-reinforced thermoplastic resin sheet will hereinafter also referred to as a "thermoplastic resin B". The thermoplastic resin B is a polymer of the bisphenol A type epoxy compound represented by Formula (1) and the bisphenol compound selected from the group consisting of bisphenol A, bisphenol F, bisphenol S, bisphenol B, bisphenol E, and bisphenol P, and the polymer has a weight-average molecular weight of 30,000 or more. The thermoplastic resin B is an in-situ polymerization type polymer and this means that when a molded body is manufactured from the fiber-reinforced thermoplastic resin sheet of the present invention, the polymer is further polymerized into a polymer having a higher molecular weight. To the thermoplastic resin B, the description on the thermoplastic resin A also applies except the description on the weight-average molecular weight. In this description, the random laminated body of the unidirectional prepregs is a sheet-shaped material acquired by heating/press-molding of a laminate formed by laminating chopped prepregs obtained by cutting the unidirectional prepreg such that the fiber direction becomes random, and such a laminate is expected to have isotropy as a sheet physical property.

With regard to the reinforcement fibers contained in the fiber-reinforced thermoplastic resin sheet of the present invention, the average content number in the thickness direction per unidirectional prepreg is ten or less. This represents that the fiber-reinforced thermoplastic resin sheet of the present invention is a laminated body of unidirectional prepregs having the average content number of reinforcement fibers equal to or less than ten in the thickness direction.

The fiber-reinforced thermoplastic resin sheet of the present invention has the average content number of reinforcement fibers in the thickness direction per unidirectional prepreg equal to or less than ten and is a sheet containing the in-situ polymerization type thermoplastic resin B and having randomly-laminated extremely thin unidirectional prepregs. Therefore, the fiber-reinforced thermoplastic resin sheet has no portion with locally excessive fiber orientation and the stress transmission is uniformly achieved through the fibers in a direction different from the fiber axis direction, so that the sheet has both high strength and moldability and less variation in strength. Additionally, since the specific thermoplastic resin B is uniformly contained between reinforcement fibers without causing voids, high strength can easily be achieved. Thus, a homogeneous molded body having high strength can be manufactured with favorable moldability by using the fiber-reinforced thermoplastic resin sheet of the present invention.

The gel fraction of the thermoplastic resin B contained in the fiber-reinforced thermoplastic resin sheet of the present invention is preferably 0 to 2%. The thermoplastic resin B contained in the fiber-reinforced thermoplastic resin sheet of the present invention is a linear polymer and is hardly three-dimensionally crosslinked like a thermosetting resin. Therefore, the resin is excellent in moldability and formativeness when a molded product is manufactured from the sheet. In contrast, a gel fraction exceeding 2% is not preferable since the moldability of the sheet may deteriorate. The gel fraction of the thermoplastic resin B contained in the fiber-reinforced thermoplastic resin sheet of the present invention is measured by using the fiber-reinforced thermoplastic resin sheet as a measurement sample with an organic solvent such as acetone, tetrahydrofuran, etc. Specific measurement conditions are as described in Examples. Since this thermoplastic resin B hardly gelates, the reinforcement fibers contained in the unidirectional prepreg or the fiber-reinforced thermoplastic resin sheet can easily be separated from the thermoplastic resin. Consequently, since the reinforcement fibers can be reused, excellent recyclability enables a reduction in amount of waste.

The weight-average molecular weight of thermoplastic resin B contained in the fiber-reinforced thermoplastic resin sheet of the present invention is 30,000 or more. The weight-average molecular weight less than 30,000 is not preferable since mechanical strength for a sheet cannot be acquired. The weight-average molecular weight of thermoplastic resin B is preferably from 30,000 to 80,000, more preferably 40,000 to 60,000, from the viewpoint of excellent strength and moldability for a sheet. When the weight-average molecular weight exceeds 80,000, the moldability may deteriorate at the time of manufacturing of a molded product, and therefore, the weight-average molecular weight equal to or less than the upper limit is preferable since the moldability is easily enhanced at the time of manufacturing a molded product. The weight-average molecular weight of the thermoplastic resin contained in the fiber-reinforced thermoplastic resin sheet of the present invention is measured by using the fiber-reinforced thermoplastic resin sheet as a measurement sample with gel permeation chromatography (GPC). Specific measurement conditions are as described in Examples.

The fiber-reinforced thermoplastic resin sheet of the present invention may be a random laminated body of the unidirectional prepregs of the present invention. The thermoplastic resin A contained in the unidirectional prepregs of the present invention is an in-situ polymerization type polymer having a weight-average molecular weight of 5,000 to 25,000 and, at the time of manufacturing the fiber-reinforced thermoplastic resin sheet through the step of heating/pressing the fiber-reinforced thermoplastic resin sheet, the polymerization of the in-situ polymerization type thermoplastic resin further progresses. This polymerization occurs not only in each of unidirectional prepregs contained in the fiber-reinforced thermoplastic resin sheet but also between adjacent unidirectional prepregs. Consequently, the unidirectional prepregs in the fiber-reinforced thermoplastic resin sheet strongly bind to each other so that high strength can be achieved.

The average length of the spread reinforcement fibers contained in the fiber-reinforced thermoplastic resin sheet of the present invention in the fiber direction per unidirectional prepreg is preferably 10 to 50 mm, more preferably 10 to 30 mm. The average length equal to or less than the upper limit is preferable since the occurrence of voids can easily be suppressed. By setting the average length within the range, the fiber-reinforced thermoplastic resin sheet of the present invention can easily be enhanced in mechanical strength and the variation thereof can easily be reduced.

The unidirectional prepreg contained in the fiber-reinforced thermoplastic resin sheet of the present invention is preferably the unidirectional prepreg of the present invention described above. In this case, the average content number of reinforcement fibers in the thickness direction, the average content density of reinforcement fibers in the width direction, the coefficient of variation (CV value) of width, and the average length in the fiber direction in the unidirectional prepreg before lamination are basically not changed before and after manufacturing the fiber-reinforced thermoplastic resin sheet from the unidirectional prepreg in the present invention as described above. Therefore, description on the preferable ranges etc. described above related to the unidirectional prepreg of the present invention also applies thereto. To the spread reinforcement fibers and the thermoplastic resin B contained in the fiber-reinforced thermoplastic resin sheet of the present invention, the description on the preferable ranges etc. described above related to the unidirectional prepreg of the present invention also applies except the description on the weight-average molecular weight of thermoplastic resin B.

The fiber-reinforced thermoplastic resin sheet of the present invention is excellent in strength and has high moldability as described above. This is considered to be due to, in addition to the polymerization of the resin at the time of manufacturing the fiber-reinforced thermoplastic resin sheet as described above, the fact that the reinforcement fibers are contained in a spread state in the unidirectional prepreg at the average content number of reinforcement fibers in the thickness direction equal to or less than ten and that the gaps (voids) not impregnated with the resin between the fibers are unlimitedly suppressed. Furthermore, since the spread reinforcement fibers are contained such that the average content number of reinforcement fibers in the thickness direction of the unidirectional prepreg is equal to or less than ten, no certain fiber orientation becomes locally excessive in the fiber-reinforced thermoplastic resin sheet so that high strength can be achieved with low coefficient of variation.

The fiber-reinforced thermoplastic resin sheet of the present invention with the characteristics described above has excellent moldability. Conventionally known prepregs often considerably contain voids, and these voids still remain in the thermoplastic resin sheet acquired from such prepregs. Therefore, to achieve sufficient strength of a molded body, it may be necessary to remove the voids by press-molding at high temperature and/or high pressure for a long time so that the voids are removed. If the fiber orientation of fibers is excessive in some portions, stress cannot be transmitted in a direction different from the fiber axis direction through the fibers so that the strength of the fibers cannot fully be utilized in some cases. However, since the occurrence of voids is unlimitedly suppressed in the fiber-reinforced thermoplastic resin sheet of the present invention and no certain fiber orientation becomes locally excessive in the fiber-reinforced thermoplastic resin sheet as described above, a molded body having sufficient strength can be manufactured even under the conditions of lower temperature, lower pressure, and shorter time than conventional conditions.

Examples of a method of manufacturing a molded body by using the fiber-reinforced thermoplastic resin sheet of the present invention include press molding. Press molding is a method of manufacturing a molded body by using a processing apparatus, a mold etc. to apply deformation such as bending, shearing, compression, etc. to the fiber-reinforced thermoplastic resin sheet of the present invention. Examples of molding forms include deep drawing, flanging, corrugating, edge curling, stamping, etc. Examples of the press molding method include a die pressing method and an autoclave method used for molding a large-size member (e.g., a member for an aircraft).

Since the resin contained in the fiber-reinforced thermoplastic resin sheet of the present invention is a thermoplastic resin, the sheet is also suitable for stamping molding in which the fiber-reinforced thermoplastic resin sheet of the present invention is heated and deformed into a shape of a forming die while the resin is melted or softened, and is subsequently cooled.

The fiber-reinforced thermoplastic resin sheet of the present invention is particularly excellent in moldability and therefore can be used in deep-drawing press molding difficult in the case of using a conventional fiber-reinforced plastic, molding under low pressure (4 MPa or less), and stamping molding capable of molding in short time.

The shape of the fiber-reinforced thermoplastic resin sheet of the present invention may appropriately be changed according to a shape of a desired molded body, and is not particularly limited.

The number of layers of unidirectional prepregs per unit thickness of the fiber-reinforced thermoplastic resin sheet of the present invention is preferably 10 layers/mm or more, more preferably 15 layers/mm or more. The number of layers of unidirectional prepregs per unit thickness is preferably not less than the lower limit from the viewpoint of easily increasing the strength of the molded body acquired from the resin sheet of the present invention. The number of layers of unidirectional prepregs per unit thickness is preferably 40 layers/mm or less, more preferably 25 layers/mm or less. The number of layers of unidirectional prepregs per unit thickness is preferably not more than the upper limit from the viewpoint of acquiring isotropic sheet physical properties. The number of layers of unidirectional prepregs per unit thickness of the fiber-reinforced thermoplastic resin sheet of the present invention is visually measured from an image of a cross section of the fiber-reinforced thermoplastic resin sheet observed with an electronic or optical microscope.

The fiber-reinforced thermoplastic resin sheet of the present invention has a favorable resin impregnating property for the reinforcement fibers of the unidirectional prepreg, and therefore, a void fraction can be preferably 0 to 1 vol %, more preferably 0 to 0.5 vol % in a fiber-reinforced thermoplastic sheet having the average thickness of 2 mm when measured according to JIS-7075. A molded body acquired from a fiber-reinforced thermoplastic resin sheet having such a low void fraction is excellent in moldability and can be increased in the mechanical strength.

The mechanical strength such as tensile strength of the fiber-reinforced thermoplastic resin sheet of the present invention differs depending on the type of reinforcement fibers contained in the fiber-reinforced thermoplastic resin sheet, the type of the resin, the thickness of the sheet, the fiber volume fraction (Vf), etc., and can be set by appropriately selecting the above items depending on the desired strength of the molded body acquired from the fiber-reinforced thermoplastic resin sheet. Comparing the mechanical strength of the fiber-reinforced thermoplastic resin sheet of the present invention with, for example, the mechanical strength of the fiber-reinforced thermoplastic resin sheet not according to the present invention although the type of reinforcement fibers, the type of resin, the sheet thickness, and the fiber volume fraction (Vf) are the same, the fiber-reinforced thermoplastic resin sheet of the present invention can achieve relatively high mechanical strength. In the fiber-reinforced thermoplastic resin sheet of the present invention, variations in mechanical strength are easily suppressed as described above. In the fiber-reinforced thermoplastic resin sheet of the present invention, for example, a fiber-reinforced thermoplastic resin sheet having the average thickness of 2 mm and the fiber volume fraction (Vf) of 40%, the bending physical properties measured according to ASTM D790 include the strength that is preferably 450 to 500 MPa and the elastic modulus that is preferably 28 to 32 GPa, and the tensile physical properties measured according to JIS K 7164 (ISO 527-4) include the strength that is preferably 250 to 300 MPa and the elastic modulus that is preferably 28 to 32 GPa. Since the fiber-reinforced thermoplastic resin sheet having the average thickness of 2 mm can achieve high bending strength and tensile strength in this way, it is expected that the fiber-reinforced thermoplastic resin sheet of the present invention is preferably utilized to achieve a reduction in weight of a versatile molded body. The bending physical properties and the tensile physical properties are measured by using a testing machine such as a universal testing machine manufactured by Shimadzu Corporation, for example, and an average value of at least 10 measurements is used an average tensile elastic modulus. Details of the measurement conditions are as described in Examples, for example.

As described above, the fiber-reinforced thermoplastic resin sheet of the present invention has substantially no portion with locally excessive fiber orientation and the stress transmission is uniformly achieved through the fibers in a direction different from the fiber axis direction as described above. The fiber-reinforced thermoplastic resin sheet of the present invention having such characteristics is considered to have less variation in strength in all directions. Therefore, when a molded body is manufactured from the fiber-reinforced thermoplastic resin sheet of the present invention, moldability becomes favorable and an isotropic molded body can be manufactured with less variation in strength.

Specifically, the coefficient of variation (CV value) of the bending strength of the fiber-reinforced thermoplastic resin sheet of the present invention is preferably 0 to 20%, more preferably 0 to 10%. The coefficient of variation (CV value) of bending elastic modulus is preferably 0 to 20%, more preferably 0 to 10%. The coefficients of variation are each calculated from the average bending strength or the average bending elastic modulus acquired as described above and the standard deviation of the results of at least ten measurements of the bending strength or the bending elastic modulus measured as described above with the equation of the coefficient of variation (CV value)=standard deviation/average value×100(%).

The coefficient of variation (CV value) of the tensile strength of the fiber-reinforced thermoplastic resin sheet of the present invention is preferably 0 to 20%, more preferably 0 to 10%. The coefficient of variation (CV value) of the tensile elastic modulus is preferably 0 to 20%, more preferably 0 to 10%. When the coefficient of variation (CV value) is lower, this means that the variation is smaller. The coefficient of variation is calculated from the average tensile strength or the average tensile elastic modulus and the standard deviation of the results of at least ten measurements of the tensile strength or the tensile elastic modulus in the same way as described above.

In addition to the fewer voids as described above, the fiber-reinforced thermoplastic resin sheet of the present invention has a lower water absorption. Particularly, the fiber-reinforced thermoplastic resin sheet of the present invention has low water absorbability even under high temperature and high humidity conditions and can suppress deterioration of the physical properties of the fiber-reinforced thermoplastic resin sheet. Consequently, the molded body manufactured from the fiber-reinforced thermoplastic resin sheet of the present invention can be enhanced in moisture resistance. The water absorption of the fiber-reinforced thermoplastic resin sheet measured according to JIS K 7209 is preferably 0 to 1 wt %, more preferably 0 to 0.3 wt %. The moisture absorption equal to or less than the upper limit is preferable since the moisture resistance of the molded body is easily enhanced and the aging degradation of the resin due to hydrolysis is easily suppressed. A measurement method of water absorption can be performed as a method described in Examples according to JIS K 7209, for example.

In the fiber-reinforced thermoplastic resin sheet of the present invention, the average interfacial shear strength of the reinforcement fiber contained in the sheet and the thermoplastic resin contained in the sheet is preferably 50 MPa or more, more preferably 70 MPa or more. When the average interfacial shear strength is not less than the lower limit, the adhesion between the reinforcement fibers and the thermoplastic resin B is high, and therefore, the interface between the fibers and the resin is hardly destroyed, so that a sheet with high formativeness is easily acquired while maintaining high strength. Although a higher upper limit of the average interfacial shear strength is more preferable, the upper limit is usually about 100 MPa or less. The average interfacial shear strength is measured by using a microdroplet method. The microdroplet method is a technique of evaluating the interfacial adhesion between fibers and resin and, specifically, in this method, after particles (droplets) of raw material compounds before polymerization are applied to a single fiber and the droplets is fixed by heating etc., a fiber pull-out test is performed. Specific measurement conditions are as described in Examples.

The fiber-reinforced thermoplastic resin sheet of the present invention is moldable at low pressure and moldable into a molded body having a complicated shape and further advantageously has favorable adhesion to urethane resin and iron. It is also advantageous that a surface transfer property of a molded product is favorable.

<Molded Body>

The present invention also provides a molded body made up of a random laminated body of the unidirectional prepreg(s) of the present invention and a molded body made up of the fiber-reinforced thermoplastic resin sheet of the present invention. These molded bodies are preferably manufactured, for example, by pressing the random laminated body of the unidirectional prepregs of the present invention or the fiber-reinforced thermoplastic resin sheet of the present invention. The uses of the molded bodies are not limited and include, for example, electric and electronic device components used in OA equipment and mobile telephones, building materials such as struts and reinforcing materials, automobile structural components, aircraft components, etc. The molded body made up of the random laminated body of the unidirectional prepreg(s) of the present invention and the molded body made up of the fiber-reinforced thermoplastic resin sheet of the present invention have high strength with less variation. The molded bodies can be used not only as a sheet but also as a reinforcing material etc. serving as a unidirectional material.

<Manufacturing Steps>

Manufacturing methods of the unidirectional prepreg, the fiber-reinforced thermoplastic resin sheet, and the molded body according to the present invention will be described.

(Manufacturing Method of Unidirectional Prepreg)

The manufacturing method of the unidirectional prepreg of the present invention comprises the steps of:

(a) opening the reinforcement fibers until the average content number in the thickness direction becomes ten or less;

(b) impregnating spread reinforcement fibers with the bisphenol A type epoxy compound represented by Formula (1):

(1)

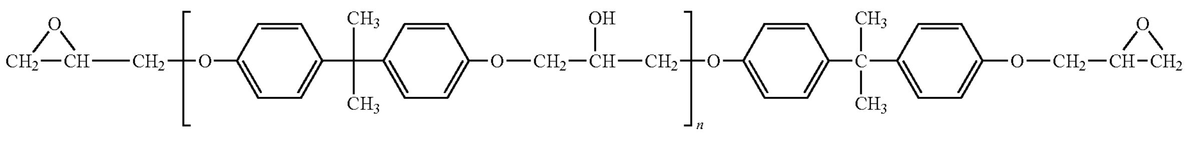

[where n is an integer of 1 to 4]

and the bisphenol compound selected from the group consisting of bisphenol A, bisphenol F, bisphenol S, bisphenol B, bisphenol E, and bisphenol P; and (c) heating the reinforcement fibers impregnated with the compounds to polymerize the compound contained in the reinforcement fibers until the weight-average molecular weight of an acquired polymer becomes 5,000 to 25,000. The average content number of the reinforcement fibers in the thickness direction of an acquired unidirectional prepreg is ten or less.

The reinforcement fibers used at step (a) described above is not particularly limited and is usually unspread reinforcement fibers also referred to as "raw yarn". Such reinforcement fibers are often wound around a cylindrical bobbin with a constant traverse width and unwind before use.

If the traverse-wound raw yarn on the cylindrical bobbin is simply unwound, a fiber bundle is fed out in a meandering state relative to a movement direction. From the viewpoint of easily acquiring the unidirectional prepreg of the present invention described above, it is preferable to use an apparatus eliminating traverse due to the raw yarn and feeding out the fiber bundle straight in the movement direction without meandering.

Figure 3:
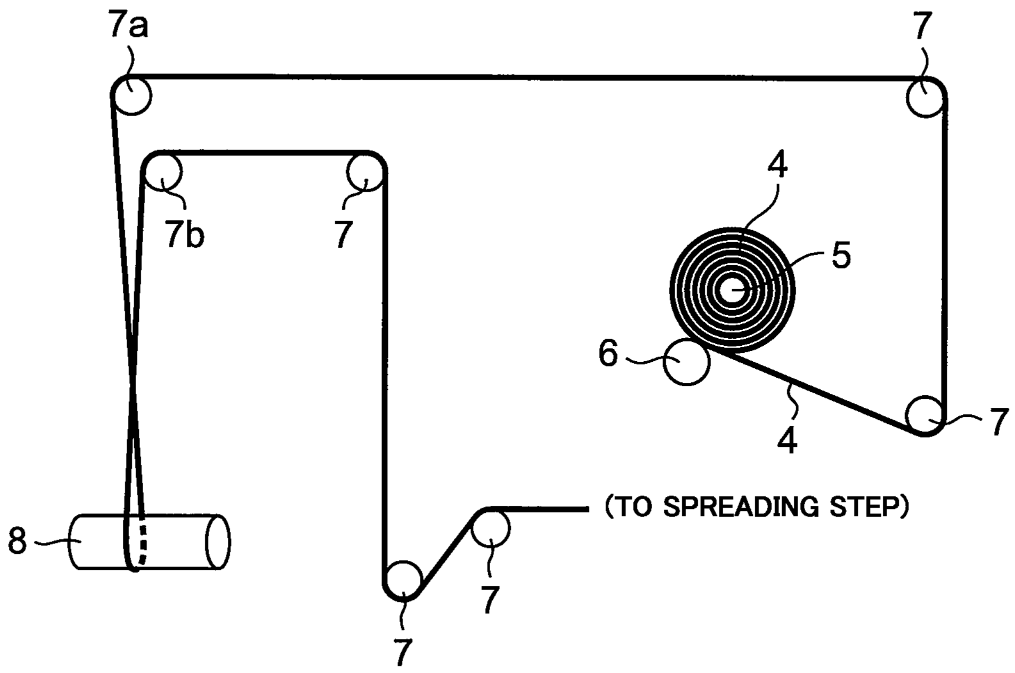
FIG. 3 is a schematic side view of an apparatus including a traverse guide.

An apparatus for eliminating the traverse is shown in FIG. 3. For example, it is preferable to use an apparatus including a feeding mechanism for unwinding and feeding out the raw yarn, a plurality of yarn guides 7, and a traverse guide 8 eliminating the traverse of the reinforcement fiber. A step of unwinding, for example, carbon fibers by using such an apparatus will hereinafter be described. As shown in FIG. 3, the traverse guide 8 is disposed on either one of the upper and lower sides of a preceding yarn guide 7*a* to perpendicularly intersect with the preceding yarn guide 7*a* (in FIG. 3, the traverse guide is disposed on the lower side of the thread guide 7*a*). In this case, the flat-shaped fiber bundle is preferably fed out such that the contact surface thereof with the guides is the same surface for all of the preceding yarn guide 7*a*, the traverse guide 8, and a subsequent yarn guide 7*b*. The feeding mechanism is exemplified by an apparatus including a raw-yarn bobbin holder 5 for setting a raw yarn 4 and a feeding tension generating motor 6. For the yarn guides 7, vertical guide rollers made of metal are preferably used. The yarn guides 7 are preferably disposed along the movement direction of the fiber bundle in substantially parallel with the raw-yarn bobbin holder 5. The diameter of the yarn guides 7 is preferably about 20 to 40 mm from the viewpoint of space saving of equipment and handling of the reinforcement fiber. The raw yarn 4 of the reinforcement fiber set in the raw-yarn bobbin holder 5 is fed out by driving the feeding tension generating motor 6 and is fed through the yarn guides 7 to step (a) for opening the reinforcement fiber.

The fiber bundle of the raw yarn 4 is twisted by 90° when fed out from the preceding yarn guide 7*a* to the traverse guide 8 and then 90° when fed out from the traverse guide 8 to the subsequent yarn guide 7*b* and is twisted once while passing through these guides. Consequently, the traverse due to the raw yarn is eliminated, and the fiber bundle can be fed out straight in the movement direction without meandering. When the fiber bundle is fed out from the preceding yarn guide to the subsequent yarn guide, an S direction, a Z direction, or a combination thereof relative to the fiber movement direction is used as the direction of the twist.

For the traverse guide 8, a vertical guide roller made of the same metal as the yarn guides 7 may be used, or a pin guide with a small diameter may be used. Furthermore, the traverse guide may be disposed and driven in a direction opposite to the movement direction of the fiber bundle by using a drive source such as a motor or may be provided with fine unevenness on the surface of the guide. By providing the traverse guide 8 such that resistance is applied to the fiber bundle as described above, an end portion of the fiber bundle can be prevented from being folded back when the fiber bundle passes through the traverse guide 8, and the fiber bundle can be fed out while maintaining the flat state (e.g., in the case of using 12K raw yarn, the width orthogonal to the fiber direction is 5 to 8 mm or 8 to 10 mm).

The interval from the traverse guide 8 to the preceding yarn guide 7*a* and the subsequent yarn guide 7*b* is preferably 1 m or more. Consequently, the end portion can be prevented from being folded back when the fiber bundle passes through the traverse guide.

At step (a), the tension applied to the reinforcement fibers at the time of opening is preferably 0.02 to 0.1 g/fiber, more preferably 0.04 to 0.06 g/fiber. By applying the tension in such a range, the opening property is easily enhanced and the fluffing due to single yarn breakage is easily suppressed. If the tension is lower than 0.02 g/fiber, the fiber bundle cannot sufficiently be spread so that the average content number in the thickness direction of the spread reinforcement fibers may not sufficiently be reduced. If the tension is higher than 0.1 g/fiber, the fluffing due to single yarn breakage may easily occur. To improve the opening property of the reinforcement fibers, at least one of an ultrasonic opening method, an electrostatic opening method, a press opening method, a jet opening method, a ventilation type opening method, etc. may be used.

Figure 4:
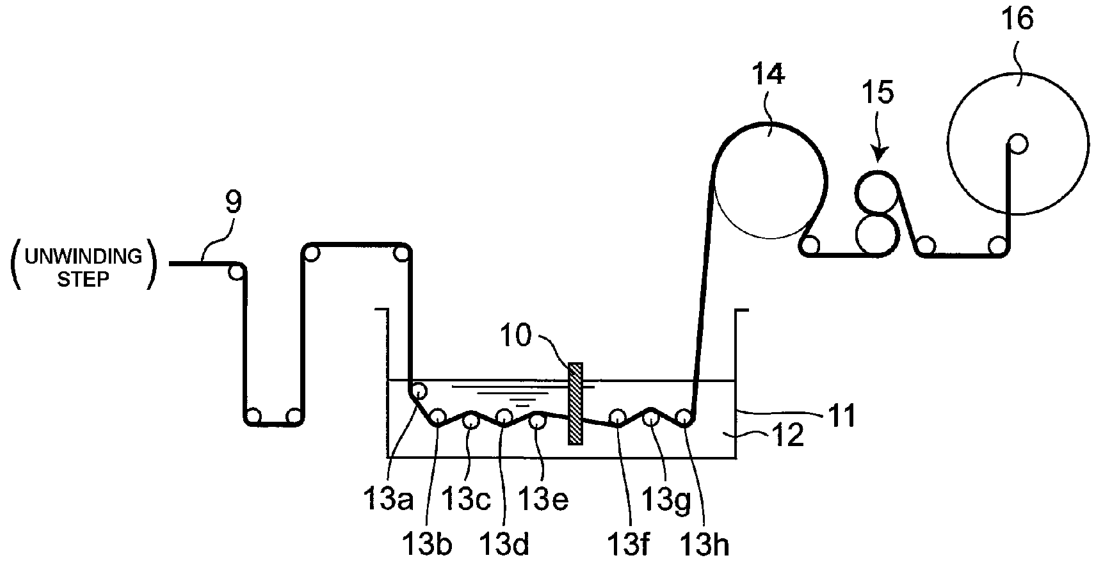
FIG. 4 is a schematic side view of an apparatus including an opening guide, a width guide and an opening tank.

At step (a), the opening may be performed by using an apparatus including an opening guide and a width guide, for example. FIG. 4 shows an apparatus including opening guides 13*a* to 13*h* and a width guide 10 as well as an opening tank 11. The opening guides 13*a* to 13*h* have a columnar shape with a predetermined diameter, for example, and are fixed at predetermined positions. The opening guides 13*a* to 13*h* apply a load to unspread reinforcement fibers 9 in a substantially radial direction, and the reinforcement fibers are pressed in a direction vertical to the movement direction thereof. Consequently, the fiber bundle is spread and the reinforcement fibers are spread. The number of the disposed opening guides is not particularly limited and may appropriately be changed depending on the width of the fiber bundle of the unspread reinforcement fibers 9 and the desired width of the unidirectional prepreg. A winding angle between the fiber bundle and the opening guides 13*a* to 13*h* may appropriately be changed in the same way.

The width guide 10 is made up of a pair of guides disposed and located on the outer side than both ends of the fiber bundle and is disposed perpendicularly to the opening guides at least at one position between the opening guides 13*a* to 13*h*. Since the fiber bundle of the unspread reinforcement fibers 9 passes through the inside of the width guide 10, the opening width of the fiber bundle can be adjusted, and the width accuracy of the spread reinforcement fibers can be enhanced. The number and the width of the width guides 10 to be disposed are not particularly limited and may appropriately be changed depending on the number of filaments of the reinforcement fibers, the desired width of the unidirectional prepreg, etc.

Although the material of the opening guides 13*a* to 13*h* and the width guide 10 is not particularly limited, metal such as steel, stainless steel, and alumina is preferably used. From the viewpoint of reducing wear of fibers, it is preferable to use the guides made of stainless steel electroplated with chromium on the surface. Since the guides of such a material have a smoothed surface, wear due to contact between the guides and the fibers can be reduced during opening, and the fluffing due to single yarn breakage can be suppressed.

The opening tank 11 is a tank disposed for storing an opening solution 12 containing a liquid such as water and may have the opening guides and the width guide disposed therein so that the reinforcement fibers can be spread while being fed out in the solution. By opening the reinforcement fibers while being immersed in the solution, a sizing agent applied at the time of manufacturing the reinforcement fibers can be removed. To increase the elution property of the sizing agent in the opening tank, the temperature of the liquid in the opening tank may be set to high temperature, or a surfactant etc. may be added to the liquid used. The opening may be performed only with the opening guide without using the opening tank 11 depending on the type of the sizing agent applied to the raw yarn used.

A restraining agent may be applied to the spread reinforcement fibers. The adhesion of the restraining agent makes it easier to enhance the restraint of the width of the spread reinforcement fibers and can suppress cracking that may occur at the time of manufacturing the unidirectional prepreg of the present invention. The restraining agent may be contained in the opening tank described above, or a tank (resizing tank) for applying the restraining agent may be disposed separately from the opening tank (desizing tank) for removing the sizing agent contained in the reinforcement fiber. The adhesion of the restraining agent makes it easy to suppress shrinkage in the width direction of the spread reinforcement fibers at the subsequent step (b). The adhesion amount of the restraining agent is preferably equal to or less than 0.8 mass %, more preferably 0.3 to 0.5 mass %, based on the weight of the reinforcement fibers in consideration of the influence on deterioration of the physical properties of the finally acquired prepreg. Although examples of the restraining agent are not particularly limited, an emulsified epoxy resin, an emulsified modified polyolefin resin, etc. are preferably utilized.

The reinforcement fibers spread as described above may subsequently be subjected to a step of removing moisture etc. contained in the reinforcement fibers, a step of drying (e.g., a drying roller 14 in FIG. 4), and a step of winding (e.g., a driving roller 15 and a winding part 16 in FIG. 4) as needed.

At the step of drying the spread reinforcement fibers, for example, a plurality of temperature-adjustable drying rolls may be used. By feeding out and bringing the fiber bundle into contact with the drying rolls, the fiber bundle can completely be dried. Although the temperature of the drying rolls may appropriately be changed depending on a tape width, a winding speed, the volatility of the solution in the opening tank, etc., a temperature range of 80 to 200° C. is preferably used. The drying rolls may have the same or different temperatures.

At the step of winding the spread reinforcement fiber, for example, a scraper, a brush, etc. may be disposed to be in contact with a roller so as to remove the fluffing due to single yarn breakage caused by contact with each roller.

By opening the reinforcement fiber unwound at the step until the average content number in the thickness direction becomes ten or less, the fibers can sufficiently uniformly be impregnated with a mixture of the bisphenol A type epoxy compound and the bisphenol compound serving as raw materials of the in-situ polymerization type thermoplastic resin A at the next step (b). If the average content number in the thickness direction is more than ten, the reinforcement fibers are excessively overlapped in the thickness direction, so that the mixture cannot sufficiently uniformly be contained in the fibers, so that a gap (void) not impregnated with the resin is generated between the fibers. The upper limit of the average content number in the thickness direction is preferably eight or less, more preferably seven or less, still more preferably six or less, from the viewpoint of facilitating the infiltration of the mixture and easily increasing the strength of the random laminated body of the unidirectional prepreg of the present invention. The lower limit of the average content number in the thickness direction may preferably be set as small as possible from the viewpoint of facilitating the infiltration of the resin and is preferably one or more, in some cases two or more, in other cases three or more although not particularly limited.

The reinforcement fibers spread through the step have a variation coefficient (CV) of width preferably equal to or less than 20%, more preferably equal to or less than 10%, further preferably equal to or less than 5%. The method of calculating the coefficient of variation is as described above for the spread reinforcement fibers included in the unidirectional prepreg. By making the coefficient of variation of width equal to or less than the upper limit, a lamination unevenness hardly occurs at the time of manufacturing the random laminated body from the prepreg of the present invention, and isotropy of a random sheet is easily ensured.

At step (b) following step (a), the spread reinforcement fibers are impregnated with the bisphenol A type epoxy compound represented by Formula (1):

(1)

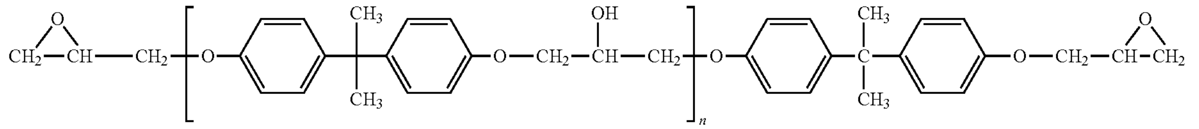

[where n is an integer of 1 to 4]

and the bisphenol compound selected from the group consisting of bisphenol A, bisphenol F, bisphenol S, bisphenol B, bisphenol E, and bisphenol P.

Although step (b) may directly be conducted from step (a), if a difference in production speed exists due to equipment or between steps, a step of winding the spread reinforcement fibers may be included (e.g., a driving roller 15 and a winding part 16 in FIG. 4).

At the step of winding, a mechanism winding the open reinforcement fibers (a winding shaft, a motor, etc.) and a reel are used. By rotating the reel attached to the winding shaft, the spread reinforcement fibers can be wound around the reel. The winding speed may appropriately be changed depending on the opening property of the fiber bundle, the width of the spread reinforcement fibers, etc., and is preferably 50 m/min or less, more preferably 5 to 30 m/min. Winding at the speed within the range is preferable since the accuracy of the width can easily be enhanced.

Each of the bisphenol A type epoxy compound and the bisphenol compound used as raw materials for impregnation at step (b) preferably has the weight-average molecular weight of 2000 or less. By using the raw materials having a low molecular weight and a low viscosity, the compounds serving as the raw materials easily infiltrate between the spread reinforcement fibers at the time of manufacturing the prepreg, and the acquired prepreg is uniformly impregnated (fully impregnated) with a thermoplastic resin that is a polymer of these compounds.

From the viewpoint of strength, rigidity, and heat resistance of the molded body acquired by using the prepreg at step (b), the bisphenol A type epoxy compound and the bisphenol compound used as raw materials are preferably contained at a mass ratio of 50:50 to 90:10, more preferably 60:40 to 80:20. The proportion of the bisphenol A type epoxy compound equal to or greater than the lower limit in terms of the mass ratio is preferable since the heat resistance of the molded body acquire from the prepreg can easily be enhanced. The proportion of the bisphenol A type epoxy compound equal to or less than the upper limit in terms of the mass ratio is preferable since the spread reinforcement fibers are easily impregnated with the bisphenol A type epoxy compound and the bisphenol compound in a favorable distributed state.

At step (b), arbitrary additives other than those above may be impregnated. Examples of the additives include an organic solvent, a reaction accelerator, a coupling agent, a curative agent, a pigment, an antifoaming agent, a fungicide, a deterioration preventive agent, etc. When these additives are added, the amounts thereof may appropriately be changed depending on a purpose of addition etc.

For example, a reaction accelerator may be used for accelerating the polymerization reaction of the resin. The bisphenol A type epoxy compound and the bisphenol compound serving as raw materials of the in-situ polymerization type thermoplastic resin are sequentially polymerized due to the electrophilic substitution reaction. Therefore, it is preferable to use a basic phosphorus-based/amine-based reaction accelerator facilitating progress of the electrophilic substitution reaction, and it is particularly preferable to use an organophosphorus compound from the viewpoint of production speed.

Example of the preferably utilized organophosphorus compound include triphenylphosphine, tri-p-tolylphosphine, diphenylcyclohexylphosphine, tricyclohexylphosphine, ethyltriphenylphosphonium bromide, benzyltriphenylphosphonium chloride, 1,4-bisdiphenylphosphinobutanone, etc.

From the viewpoint of setting the weight-average molecular weight of the polymer of the raw material compounds within the preferable range, for example, from the viewpoint of easily setting the weight-average molecular weight to 5,000 to 25,000 in the unidirectional prepreg and to 30,000 or more in the fiber-reinforced thermoplastic resin sheet, the reaction accelerator is preferably used in an amount of 2 to 3 parts by mass based on 100 parts by mass of the polymer contained in the unidirectional prepreg. The spread reinforcement fibers are preferably impregnated with the reaction accelerator at step (b) together with the mixture containing the bisphenol A type epoxy compound and the bisphenol compound serving as raw materials.

With regard to a method of impregnation with the bisphenol A type epoxy compound and the bisphenol compound serving as raw materials of the in-situ polymerization type thermoplastic resin at step (b), the spread reinforcement fibers may directly be impregnated with the raw materials or may be impregnated by using a varnish containing the raw materials and an organic solvent. From the viewpoint of enhancing the permeability to the reinforcement fibers by lowering the viscosity of the resin and facilitating the impregnation without generating voids between the reinforcement fibers, the varnish is preferably used for the impregnation. The organic solvent containable in the varnish is preferably an organic solvent having high solubility to the bisphenol A type epoxy compound and the bisphenol compound, more preferably a polar solvent such as DNP and NMP, still more preferably a ketone-based solvent, and particularly preferably methyl ethyl ketone. The content of the organic solvent is preferably 10 to 20 parts by mass based on 100 parts by mass of the raw materials to be used from the viewpoint of the impregnating property of compounds serving as raw materials and the productivity.

The impregnation method is not particularly limited and may be performed by using a discharge die to apply the compounds serving as raw materials of the in-situ polymerization type thermoplastic resin or a solution thereof onto the upper and lower surfaces of the spread reinforcement fibers, or may be performed by immersing the spread reinforcement fibers into a solution containing the compounds serving as raw materials of the in-situ polymerization type thermoplastic resin. The reinforcement fibers impregnated with the compounds or the solution of the compounds easily shrink in the width direction due to the surface tension of the compounds or the solution. This shrinkage may cause an increase in thickness, disturbance of fiber directionality, occurrence of cracking, etc. To prevent such shrinkage, for example, a coating apparatus is preferably used at step (b).

Figure 6:
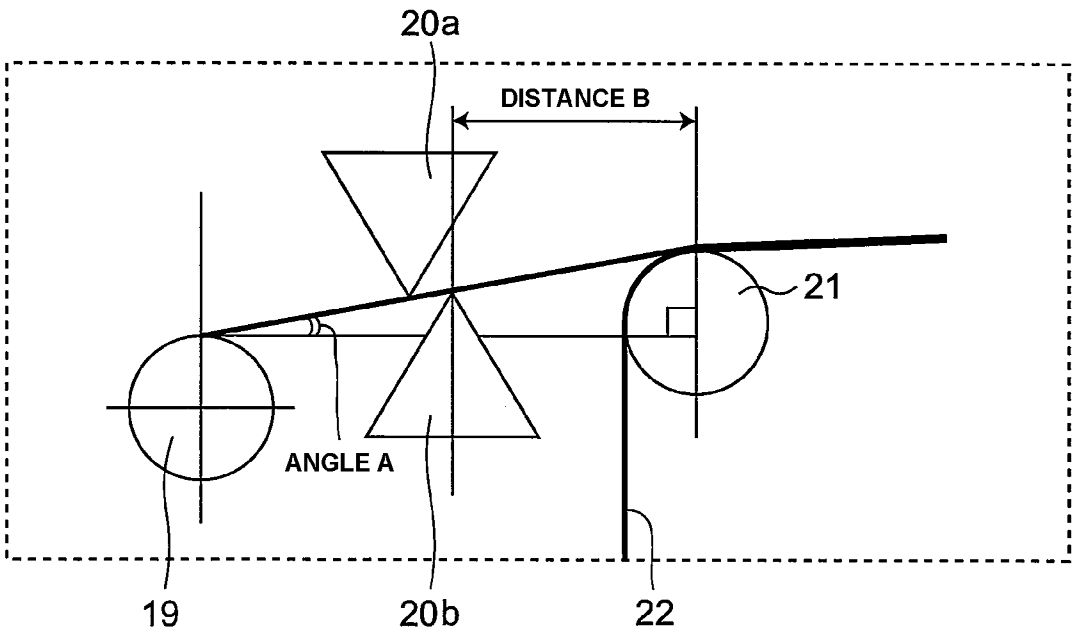
FIG. 6 is a schematic side view of a manufacturing apparatus used for impregnating the unidirectional prepregs of Examples and Comparative Examples with resin compositions.
Figure 7:
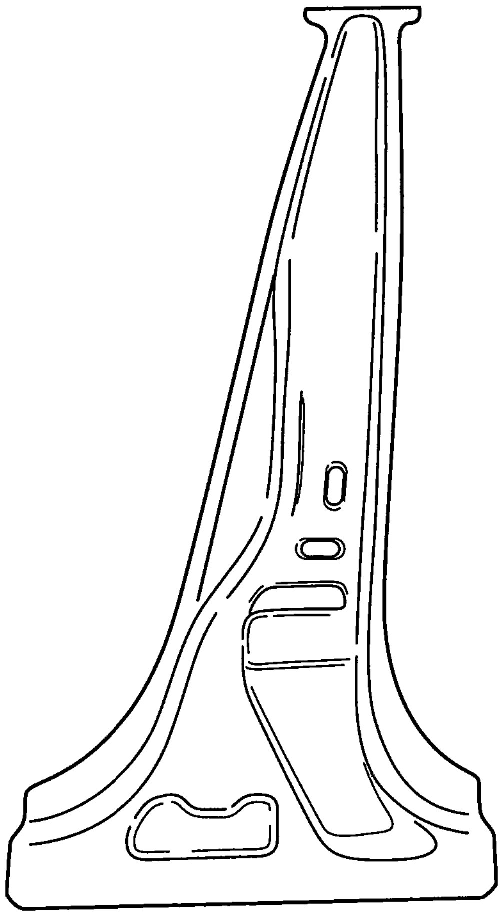
FIG. 7 is a view of a mold used in Examples.
Figure 8:
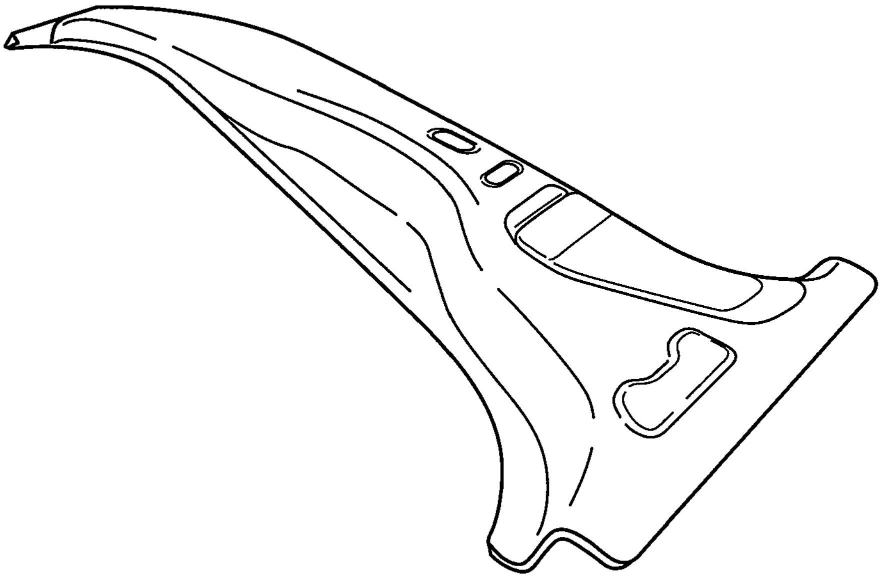
FIG. 8 is a view of the mold used in Examples.
Figure 9:
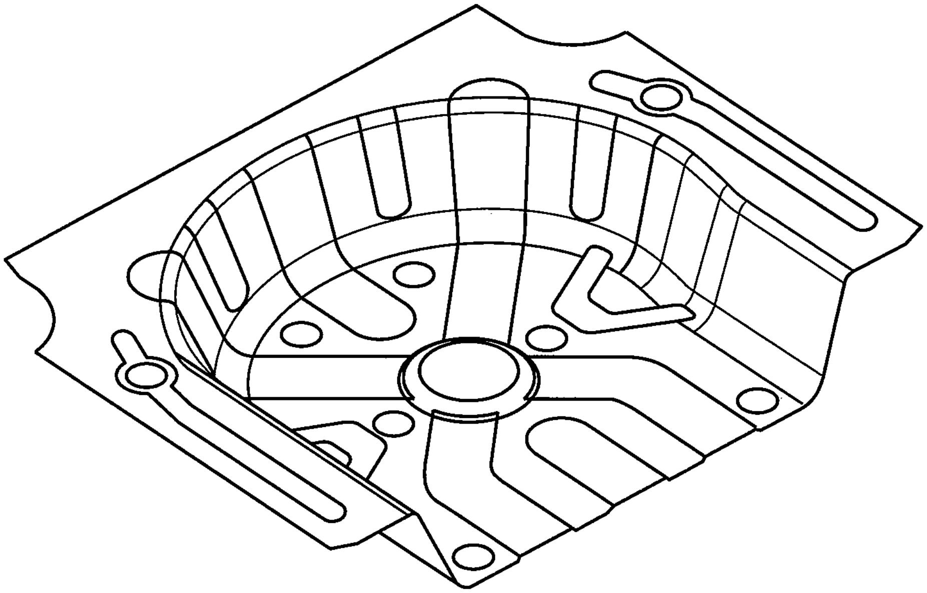
FIG. 9 is a view of a mold used in Examples.

In the case of using a discharge die to apply the compounds serving as raw materials of the in-situ polymerization type thermoplastic resin or a solution thereof onto the upper and lower surfaces of the spread reinforcement fibers, a mechanism shown in FIG. 6 may be used.

The mechanism shown in FIG. 6 includes a yarn guide roller 19 for guiding the spread reinforcement fibers, resin discharge dies (20*a*, 20*b*), a conveyance belt 22 conveying the reinforcement fiber after impregnation, and conveyance rollers 21.

The conveyance roller 21*a* is disposed at a position higher than the yarn guide roller 19. The conveyance rollers 21 are disposed at positions with the height satisfying 21*a*>21*b*>21*c*, and the reinforcement fibers after impregnation with the raw material compounds are conveyed while a tension is given to the surface of the belt. Consequently, the shrinkage during polymerization of the bisphenol A type epoxy compound and the bisphenol compound can be suppressed at the subsequent solidification step and the solidification can be achieved while maintaining the width accuracy of the spread reinforcement fibers.

The resin discharge die 20 is disposed to coat and/or impregnate the spread reinforcement fibers with the raw material compounds and is made up of a pair of dies (20*a*, 20*b*) disposed on both sides of a conveyance path of the reinforcement fibers. The pair of the resin discharge dies (20*a*, 20*b*) is disposed at different positions relative to a conveyance direction of a substrate. Consequently, the raw material compounds can be applied from the upper and lower surfaces of the reinforcement fibers, and the raw material compounds can permeate between the reinforcement fibers without generating voids. The front-rear relationship of discharge ports of the impregnation dies is not particularly limited as long as the dies are disposed at different positions relative to the conveyance direction of the substrate. Materials of die heads and shims used for the dies are not particularly limited as long as the materials are metal, and stainless steel etc. are preferably used.

The reinforcement fibers impregnated with the compounds serving as raw materials of the in-situ polymerization type thermoplastic resin is fed through the conveyance rollers 21 to a step of solidification (a drying furnace 23).

If the spread reinforcement fibers are immersed in the solution containing the raw material compounds, the impregnation with the raw material compounds may be followed by a squeezing step of squeezing the reinforcement fiber with rollers to remove the liquid. A squeezing pressure P applied to the rollers is preferably 0.05 MPa to 0.3 MPa, more preferably 0.1 MPa to 0.25 MPa. This enables removal of voids and control of the amount of the contained compounds. The squeezing pressure equal to or less than the lower limit is not preferable in some cases since a resin adhesion amount is unstable and voids remain within the unidirectional prepreg. The squeezing pressure equal to or greater than the upper limit is not preferable in some cases since it becomes difficult to increase the resin amount of the unidirectional prepreg.

Subsequently, the raw material compounds contained in the reinforcement fiber are solidified. A method of solidification is performed by heating. Although a heating temperature may appropriately be changed depending on a type of the reinforcement fiber used and a type of solvent in the case of using the solution of the raw material compounds, the solidification is preferably performed in a temperature range higher than the glass transition temperature of the thermoplastic resin to be acquired and not causing deactivation of the reactive groups of the raw materials and the reaction accelerator, and the heating is preferably performed in a temperature range of 100 to 200° C. Although the heating method is not particularly limited, the heating methods using near infrared, far infrared, and middle infrared are preferably used.

This solidification causes the bisphenol A type epoxy compound and the bisphenol compound to linearly polymerize so that a unidirectional prepreg containing the in-situ polymerization type thermoplastic resin A having a weight-average molecular weight of 5,000 to 25,000, preferably 5,000 to 20,000, more preferably 7,000 to 15,000 is acquired. If a varnish containing raw materials and an organic solvent is used for impregnation, the polymerization reaction of the bisphenol A type epoxy compound and the bisphenol compound progresses as the solvent volatilizes.

A resin impregnation amount at step (b) is preferably controlled such that the reinforcement fiber volume fraction Vf in the finally acquired unidirectional prepreg is preferably 10 to 80%, more preferably 20 to 60%, further preferably 35 to 55%, particularly preferably 25 to 45%. The range described above is preferable from the viewpoint of the moldability of the molded body acquired from the prepreg of the present invention. The volume fraction equal to or greater than the upper limit is not preferable in some cases since entangling positions (non-impregnated portions) between the fibers increase and make it difficult to achieve a voidless state. The volume fraction equal to or less than the lower limit is not preferable in some cases since it is difficult to ensure the strength of the molded body.

(Manufacturing Method of Fiber-Reinforced Thermoplastic Resin Sheet)

The fiber-reinforced thermoplastic resin sheet of the present invention can be produced by a manufacturing method comprising, for example, the following steps:

(1) randomly laminating tape-shaped unidirectional prepregs containing spread reinforcement fibers and a thermoplastic resin to acquire a laminate, wherein the thermoplastic resin is a polymer of the bisphenol A type epoxy compound represented by Formula (1):

(1)

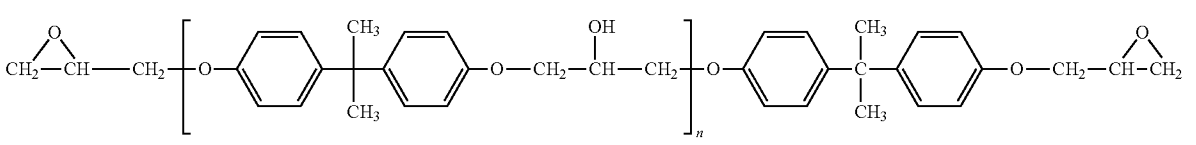

[where n is an integer of 1 to 4]

and the bisphenol compound selected from the group consisting of bisphenol A, bisphenol F, bisphenol S, bisphenol B, bisphenol E, and bisphenol P, wherein the weight-average molecular weight of the polymer is 5,000 to 25,000, preferably 7,000 to 20,000, more preferably 7,000 to 15,000, wherein the average content number of the reinforcement fibers in the thickness direction of the unidirectional prepregs is ten or less, and wherein the average length in the fiber direction per unidirectional prepreg is 10 to 50 mm, preferably 10 to 30 mm, and (2) heating the laminate at a temperature of 100 to 200° C.

A fiber-reinforced thermoplastic resin sheet can be manufactured by arranging the unidirectional prepregs manufactured as described above such that the prepregs are randomly laminated in a mold having a desired size, for example, and heating and pressurizing the prepregs. For a method of random lamination, if the fiber-reinforced thermoplastic resin sheet is continuously manufactured, a preferable method is to allow the unidirectional prepregs cut as described above to naturally drop from a high position for deposition/lamination on a conveyor such as a steel belt or to blow air into the falling path or attach a baffle plate etc. In the case of batch manufacturing, a preferable method is to accumulate the unidirectional prepregs cut as described above in a container and to disperse the prepregs into a mold etc. for manufacturing a sheet by a conveying apparatus attached to a lower surface of the container.

The polymer contained in the unidirectional prepreg used in the manufacturing method of the present invention is an in-situ polymerization type thermoplastic resin. The weight-average molecular weight is 5,000 to 25,000, preferably 7,000 to 20,000, more preferably 7,000 to 15,000. The weight-average molecular weight equal to or greater than the lower limit is preferable for retaining the shape of the unidirectional prepregs contained in the sheet after manufacturing the thermoplastic resin sheet, and the weight-average molecular weight equal to or less than the upper limit is preferable since the remaining voids can be reduced at the time of manufacturing the fiber-reinforced thermoplastic resin sheet.

At the step of randomly laminating the unidirectional prepregs to acquire a laminate, the unidirectional prepregs are randomly laminated in a mold having a predetermined size (e.g., 300 mm square, 600 mm square). In this case, the height of the acquired laminate is about 20 to 50 mm although differing depending on the length in the fiber direction of the unidirectional prepregs used, and it is preferable that the height is substantially uniform relative to a mold surface. Consequently, the acquired fiber-reinforced thermoplastic resin sheet has a constant number of laminated layers of the unidirectional prepregs in the thickness direction, and the mechanical strength becomes isotropic.

By heating the laminate of the unidirectional prepregs randomly laminated as described above, the thermoplastic resin is integrated and the fiber-reinforced thermoplastic resin sheet of the present invention is acquired. Pressurization may be performed together with heating. The heating temperature at the time of manufacturing the fiber-reinforced thermoplastic resin sheet of the present invention is preferably 100 to 200° C., more preferably 150 to 180° C. If the pressurization is performed, the pressure during pressurization is preferably 0.1 to 10 MPa, more preferably 1 to 5 MPa. Specifically, for example, the heating may be performed by a method including allowing the laminate of the unidirectional prepregs deposited/laminated on a conveyor such as a steel belt to pass between hot rolls together with the steel belt for heating, pressurization, or intermittent pressing, a method including continuous heating and cooling by a belt press, a method including preheating with a far infrared heater followed by a cold press, or a batch method using a heating/cooling press. The heating temperature at the time of manufacturing the fiber-reinforced thermoplastic resin sheet of the present invention is preferably in a temperature range higher than the glass transition temperature of the in-situ polymerization type thermoplastic resin and not causing deactivation of the reactive groups of the raw materials and the reaction accelerator, and the heating is preferably performed in a temperature range of 100 to 200° C., more preferably 150 to 180° C. Consequently, the fluidity of the resin can be maintained while promoting the polymerization of the resin and gaps present between laminated prepregs can be filled by further pressurization. Consequently, voids in the acquired molded body can easily be reduced.

When the fiber-reinforced thermoplastic resin sheet of the present invention is manufactured by the manufacturing method comprising (1) and (2) described above, the unidirectional prepregs containing the in-situ polymerization type thermoplastic resin used at step (1) has a relatively low weight-average molecular weight of 5,000 to 25,000, and therefore, the polymerization of the in-situ polymerization type thermoplastic resin further progresses at step (2) of heating the laminate. This polymerization occurs not only in each of the unidirectional prepregs contained in the fiber-reinforced thermoplastic resin sheet but also between the adjacent unidirectional prepregs. Consequently, the unidirectional prepregs in the fiber-reinforced thermoplastic resin sheet strongly bind to each other so that high strength is achieved. At the step of heating the laminate, the polymerization is preferably performed until the weight-average molecular weight of the acquire polymer reaches 30,000 or more.

Consequently, the fiber-reinforced thermoplastic resin sheet of the present invention has both high strength and moldability as described above. This is considered to be due to, in addition to the polymerization of the resin at the time of manufacturing the fiber-reinforced thermoplastic resin sheet as described above, the fact that the reinforcement fibers are contained in a spread state at the average content number of reinforcement fibers in the thickness direction per unidirectional prepreg equal to or less than ten and that the gaps (voids) not impregnated with the resin between the fibers are suppressed to an extremely high level. Furthermore, since the fiber-reinforced thermoplastic resin sheet of the present invention contains the spread reinforcement fibers such that the average content number of reinforcement fibers in the thickness direction per unidirectional prepreg is equal to or less than ten, no portion has locally excessive fiber orientation in the fiber-reinforced thermoplastic resin sheet, so that high strength can be achieved with low coefficient of variation.

<Molded Body>

(Manufacturing Method of Molded Body)

The fiber-reinforced thermoplastic resin sheet of the present invention has both high strength and moldability as well as less variation in strength and can preferably be used as an intermediate material for manufacturing various fiber-reinforced plastic molded bodies. Conventionally known prepregs often considerably contain voids, and these voids still remain in the thermoplastic resin sheet acquired from such prepregs. Therefore, sufficient strength of the molded body could not be acquired due to the voids. To achieve sufficient strength of the molded body, it might have been necessary to remove the voids by press-molding at high temperature and/or high pressure for a long time so that the voids are removed. Additionally, if the fiber orientation was excessive in some portions, it might have been necessary to perform molding at high pressure so as to reduce the influence from the excessive fiber orientation. However, since the fiber-reinforced thermoplastic resin sheet of the present invention contains the in-situ polymerized thermoplastic resin so that the occurrence of voids is suppressed to an extremely high level and that portions of locally excessive fiber orientation are extremely reduced or eliminated in the fiber-reinforced thermoplastic resin sheet, the molded body having sufficient strength can be manufactured even under the conditions of a lower temperature, a lower pressure, and a shorter time than conventional conditions.

A method of manufacturing a molded body by using the fiber-reinforced thermoplastic resin sheet of the present invention may be press molding. Press molding is a method of manufacturing a molded body by using a processing apparatus, a mold etc. to apply deformation such as bending, shearing, compression, etc. to the fiber-reinforced thermoplastic resin sheet of the present invention. Examples of molding forms include deep drawing, flanging, corrugating, edge curling, stamping, etc.

Preferable examples of the press molding method include a heat and cool method in which a mold is heated for molding and then cooled, and a cold press (stamping) method in which molding with a low-temperature mold is performed while a sheet is heated and softened.

From the viewpoint of the fluidity of the resin, conditions at the time of manufacturing a molded body by press molding from fiber-reinforced thermoplastic resin sheet of the present invention include a press temperature that is preferably 150 to 250° C., more preferably 180 to 220° C., a press pressure that is preferably 0.1 to 10 MPa, a press time that is preferably 10 seconds to 10 minutes, more preferably 20 seconds to 5 minutes. These conditions may appropriately be changed depending on a desired thickness, a shape, etc. of the molded body.

(Molded Body)

The use of the molded body manufactured from the fiber-reinforced thermoplastic resin sheet of the present invention is not limited and include, for example, electric and electronic device components used in OA equipment and mobile telephones, building materials such as struts and reinforcing materials, automobile structural components, aircraft components, etc. The molded body manufactured from the fiber-reinforced thermoplastic resin sheet of the present invention has high strength with less variation. The molded body can be used not only as a sheet but also as a reinforcing material etc. serving as a unidirectional material.

EXAMPLES

The present invention will hereinafter specifically be described with examples; however, the scope of the present invention is not limited thereto.

Figure 5:
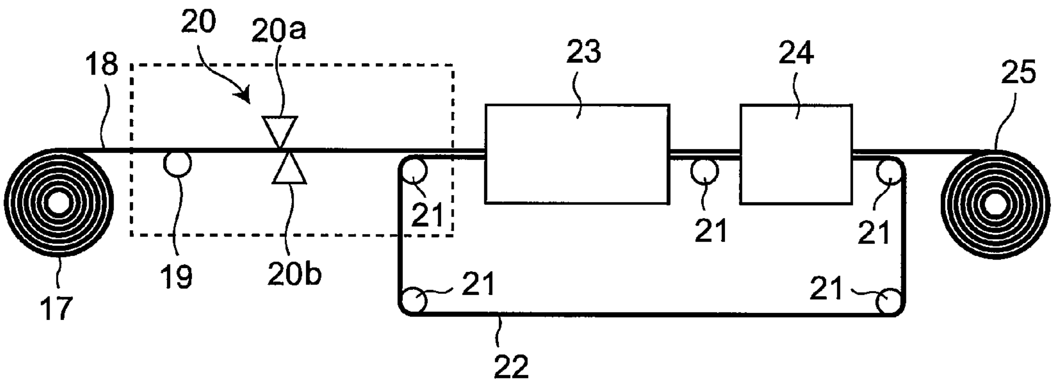
FIG. 5 is a schematic side view of a manufacturing apparatus used for manufacturing unidirectional prepregs of Examples and Comparative Examples.

FIG. 5 shows a schematic side view of a manufacturing apparatus used for manufacturing unidirectional prepregs of Examples and Comparative Examples. The manufacturing apparatus has a winding package 17 of spread reinforcement fibers, the yarn guide roller 19, the resin discharge die 20, the conveyance belt guide roller 21, the conveyance belt 22, the drying furnace (polymerization furnace) 23, and a cooling apparatus 24.

For detailed description of the apparatus related to the step of impregnating the spread reinforcement fibers with a resin, FIG. 6 shows details of a portion of the manufacturing apparatus shown in FIG. 5. In FIG. 5, the spread reinforcement fibers come into contact with the yarn guide roller 19 at the same height as the height at which the reinforcement fiber impregnated with the resin comes into contact with the conveyor belt 22; however, in some of Examples and Comparative Examples, the height was actually adjusted to form a slope at an angle A as shown in FIG. 6.

<Measurement of Weight-Average Molecular Weight>

The weight-average molecular weight of the resin was measured by using gel permeation chromatography. Specific measurement conditions are as follows.

In the measurement of the weight-average molecular weight of the resin contained in prepregs 1 and 2 acquired in Manufacturing Examples 3 and 4 described later, the resin was extracted from each of the prepregs by using tetrahydrofuran, and the resin concentration of the extraction liquid was adjusted to 1 wt % to acquire a measurement sample.

In the measurement of the weight-average molecular weight of the thermoplastic resin contained in fiber-reinforced thermoplastic resin sheets 1 to 3 acquired in Examples 1 to 3, the thermoplastic resin was extracted from each of the fiber-reinforced thermoplastic resin sheets by using tetrahydrofuran, and the resin concentration of the extraction liquid was adjusted to 1 wt % to acquire a measurement sample.

<Measurement of Average Bending Strength and Average Bending Elastic Modulus>

The average bending strength and the average bending elastic modulus were measured by using a universal testing machine (100 kN Tensilon) manufactured by Shimadzu Corporation according to ASTM D790. For measurement samples, a multiplicity of test pieces was prepared by cutting out to the length of 80 mm, the width of 35 mm, and the thickness of 2 mm from the fiber-reinforced thermoplastic resin sheets acquired in Examples and Comparative Examples, and ten pieces were taken out and used therefrom. An average value and CV were calculated from the results acquired in ten measurements.

<Measurement of Average Tensile Strength and Average Tensile Elastic Modulus>

The average tensile strength and the average tensile elastic modulus were measured by using a universal testing machine (Autograph AG-100kNXplus) manufactured by Shimadzu Corporation according to JIS K 7100. For measurement samples, a multiplicity of test pieces was prepared by cutting out to the length of 80 mm, the width of 35 mm, and the thickness of 2 mm from the fiber-reinforced thermoplastic resin sheets acquired in Examples and Comparative Examples or molded bodies acquired in Moldability Tests 2 and 3, and ten pieces were taken out and used therefrom. An average value and CV were calculated from the results acquired in ten measurements.

<Measurement of Interfacial Shear Strength>

The interfacial shear strength was measured by the micro-droplet method. Specifically, after a single fiber was taken out from the spread reinforcement fibers described in Manufacturing Example 1 and the single fiber was fixed by metal fittings, droplets of a resin composition described in Manufacturing Example 2 were attached thereto, and a heat treatment was performed under the conditions of 150° C. for 30 minutes so as to fix the droplets to the single fiber. A pull-out test was performed on 10 droplets fixed on the short fiber. For the pull-out test, a composite material interface property evaluation apparatus (MODEL HM410) manufactured by Toei Sangyo Co., Ltd. was used. An interfacial shear strength τ was obtained from a maximum pull-out load F obtained from the test, an embedment length (L) of a resin ball measured in advance, and a fiber diameter (D) with the following equation.

$$\tau = \frac{F}{\pi DL}$$

An average interfacial shear strength was calculated from the results acquired in ten measurements. Consequently, the average interfacial shear strength between the fiber and the resin composition was 72.7 [MPa].

<Measurement of Water Absorption>

Water absorption was measured according to JIS K 7209. Three 100 mm square test pieces having the thickness of 2 mm were cut out from the fiber-reinforced thermoplastic resin sheet acquired in Example 9 and dried at 50° C. according to Standard Method D. Drying was repeated until weight variation became about ±0.1 mg. This was defined as a test piece mass $m_1$ after drying. The test pieces after drying were left in a constant temperature and humidity chamber at 50% RH and 23° C. (within ±1° C.) and weighed after 24 hours. The test pieces were left in the constant temperature and humidity chamber and weighed every 24 hours until weight variation became ±0.1 mg. This was defined as a test piece mass $m_2$ after absorption of water.

A water absorption (mass percentage of absorbed water) c of each of the test pieces was calculated from $m_1$ and $m_2$ with the following equation.

$$c = \frac{(m2 - m1)}{m1} \times 100$$

The arithmetic mean value of the three values acquired from the three test pieces for the same water absorption time was defined as the water absorption of the fiber-reinforced thermoplastic resin sheet.

Manufacturing Example 1: Method of Opening Reinforcement Fibers

An apparatus opening the reinforcement fibers included a mechanism feeding out the raw yarn, a mechanism winding the spread reinforcement fibers, a guide through which the carbon fibers pass, an opening tank in which the reinforcement fibers are spread, and a control mechanism controlling a feed or winding speed. The mechanism feeding out the raw yarn had an apparatus eliminating the traverse. The fiber bundle was threaded at a winding speed of 20 m/min and, after the fiber bundle is unwound under the condition of the tension of 0.04 to 0.06 g/fiber, the fiber was spread by pressurizing the fiber bundle while being immersed in the solution in the opening tank, and the moisture was dried to acquire the spread reinforcement fibers (hereinafter also referred to as an "spread tape"). In Examples and Comparative Examples, a guide width was adjusted so that a desired average width was acquired. The filament number of the reinforcement fibers, the average width and the coefficient of variation thereof, and the average content number of spread reinforcement fibers in the thickness direction used in Examples and Comparative Examples are as described in Examples. The average width of spread reinforcement fibers and the coefficient of variation thereof were acquired by measuring the width by using a camera.

Manufacturing Example 2: Manufacturing of Resin Composition

By preparing and homogeneously mixing 1,000 g of XNR6850 manufactured by Nagase ChemteX Corporation (containing 550 g of the bisphenol A type epoxy compound represented by Formula (1) having a weight-average molecular weight of 200 to 1,000, 300 g of bisphenol A, and 100 g of methyl ethyl ketone) and 80 g of reaction accelerator (XNH6850) (containing 27 g of methyl ethyl ketone, 27 g of ethyl acetate, and 24 g of organophosphorous compound) by using a stirrer to acquire a resin composition having a viscosity of 100 to 200 mPa·s.

Example 1

A raw yarn (a) of carbon fibers having the single yarn diameter of 7 μm and the filament number of 12 k was spread according to the method of Manufacturing Example 1. The spread carbon fibers (hereinafter also referred to as an "spread tape 1") had the average width of 16 mm, the coefficient of variation (CV) of width of 2.4%, and the average content number of reinforcement fibers in the thickness direction of 5.25. The spread tape 1 was threaded at a predetermined speed (4 mm/min), and the resin composition acquired in Manufacturing Example 2 was discharged from the resin discharge die (impregnation die) to impregnate the tape. The details of setting of the apparatus at the impregnation step include a distance B of 20 mm between the center of the conveyance belt guide roller 21 and the lower-surface die head 20*b* shown in FIG. 6 and the angle A of 1 degree. The resin impregnated tape after impregnation was received by the conveyance belt and allowed to pass through a drying/polymerization furnace set to 200° C. for one minute to manufacture a tape-shaped unidirectional prepreg 1. The length of the manufactured tape was 2000 m. The tension applied to the tape at the step was 300 g. Consequently, the acquired prepreg had the average thickness of 0.071 mm, the average width of 15.1 mm, and the fiber volume fraction (Vf) of 40% (adhesion amount accuracy of ±2%). The acquired prepreg had favorable resin adherability on both surfaces.

Example 2

A raw yarn (b) of carbon fibers having the single yarn diameter of 7 μm and the filament number of 12 k was spread according to the method of Manufacturing Example 1. The spread carbon fibers (hereinafter also referred to as an "spread tape 2") had the average width of 16 mm, the coefficient of variation (CV) of width of 4.7%, and the average content number of reinforcement fibers in the thickness direction of 5.25. By using the spread tape 2, a tape-shaped unidirectional prepreg 2 was manufactured in the same way as Example 1 except setting the distance B shown in FIG. 6 to 10 mm and the angle A to 2 degrees. Consequently, the acquired prepreg had the average thickness of 0.06 mm, the average width of 17.1 mm, and the fiber volume fraction (Vf) of 40% (adhesion amount accuracy of ±2%). The acquired prepreg had favorable resin adherability on both surfaces.

Example 3

A raw yarn (c) of carbon fibers having the single yarn diameter of 7 μm and the filament number of 12 k was spread according to the method of Manufacturing Example 1. The spread carbon fibers (hereinafter also referred to as an "spread tape 3") had the average width of 13 mm, the coefficient of variation (CV) of width of 4.4%, and the average content number of reinforcement fibers in the thickness direction of 6.46. By using the spread tape 3, a tape-shaped unidirectional prepreg 3 was manufactured in the same way as Example 1 except setting the distance B shown in FIGS. 6 to 10 mm and the angle A to 2 degrees. Consequently, the acquired prepreg had the average thickness of 0.10 mm, the average width of 14.1 mm, and the fiber volume fraction (Vf) of 40% (adhesion amount accuracy of ±2%). The acquired prepreg had favorable resin adherability on both surfaces.

Example 4

A raw yarn (d) of carbon fibers having the single yarn diameter of 7 μm and the filament number of 12 k was spread according to the method of Manufacturing Example 1. The spread carbon fibers (hereinafter also referred to as an "spread tape 4") had the average width of 13 mm, the coefficient of variation (CV) of width of 4.1%, and the average content number of reinforcement fibers in the thickness direction of 6.46. By using the spread tape 4, a tape-shaped unidirectional prepreg 4 was manufactured in the same way as Example 1 except setting the distance B shown in FIGS. 6 to 20 mm and the angle A to 1 degree. Consequently, the acquired prepreg had the average thickness of 0.10 mm, the average width of 13.2 mm, and the fiber volume fraction (Vf) of 40% (adhesion amount accuracy of ±2%). The acquired prepreg had favorable resin adherability on both surfaces.

Example 5

A raw yarn (e) of carbon fibers having the single yarn diameter of 7 μm and the filament number of 60 k was spread according to the method of Manufacturing Example 1. The spread carbon fibers (hereinafter also referred to as an "spread tape 5") had the average width of 80 mm, the coefficient of variation (CV) of width of 3.8%, and the average content number of reinforcement fibers in the thickness direction of 5.25. By using the spread tape 5, a tape-shaped unidirectional prepreg 5 was manufactured in the same way as Example 1 except setting the tension applied to the tape to 1000 g, the distance B shown in FIGS. 6 to 20 mm, and the angle A to 1 degree. Consequently, the acquired prepreg had the average thickness of 0.072 mm, the average width of 78 mm, and the fiber volume fraction (Vf)

of 40% (adhesion amount accuracy of ±2%). The acquired prepreg had favorable resin adherability on both surfaces.

Example 6

A raw yarn (f) of carbon fibers having the single yarn diameter of 7 μm and the filament number of 15 k was spread according to the method of Manufacturing Example 1. The spread carbon fibers (hereinafter also referred to as an "spread tape 6") had the average width of 17 mm, the coefficient of variation (CV) of width of 1.6%, and the average content number of reinforcement fibers in the thickness direction of 6.2. By using the spread tape 6, a tape-shaped unidirectional prepreg 6 was manufactured in the same way as Example 1 except setting the distance B shown in FIGS. 6 to 20 mm and the angle A to 1 degree. Consequently, the acquired prepreg had the average thickness of 0.075 mm, the average width of 15 mm, and the fiber volume fraction (Vf) of 40% (adhesion amount accuracy of ±2%). The acquired prepreg had favorable resin adherability on both surfaces.

Example 7

A raw yarn (g) of carbon fibers having the single yarn diameter of 7 μm and the filament number of 12 k was spread according to the method of Manufacturing Example 1. At the opening step, a modified polyolefin resin was applied as a restraining agent in an amount of 0.4% based on the weight of the carbon fiber. The spread carbon fibers (hereinafter also referred to as an "spread tape 7") had the average width of 17 mm, the coefficient of variation (CV) of width of 1.6%, and the average content number of reinforcement fibers in the thickness direction of 6.2. By using the spread tape 7, a tape-shaped unidirectional prepreg 7 was manufactured in the same way as Example 1 except setting the distance B shown in FIGS. 6 to 20 mm and the angle A to 1 degree. Consequently, the acquired prepreg had the average thickness of 0.095 mm, the average width of 13 mm, and the fiber volume fraction (Vf) of 40% (adhesion amount accuracy of ±2%). The acquired prepreg had favorable resin adherability on both surfaces.

Comparative Example 1

A raw yarn (h) of carbon fibers having the single yarn diameter of 7 μm and the filament number of 12 k was spread according to the method of Manufacturing Example 1. The spread carbon fibers (hereinafter also referred to as an "spread tape 8") had the average width of 16 mm, the coefficient of variation (CV) of width of 6.4%, and the average content number of reinforcement fibers in the thickness direction of 5.25. By using the spread tape 8, a tape-shaped unidirectional prepreg 8 was manufactured in the same way as Example 1 except setting the distance B shown in FIGS. 6 to 70 mm and the angle A to 10 degrees. During manufacturing of the unidirectional prepreg 8, shrinkage of the reinforcement fibers was observed in the width direction. Consequently, the acquired prepreg had the average thickness of 0.17 mm, the average width of 7.1 mm, and the fiber volume fraction (Vf) of 40% (adhesion amount accuracy of ±2%). The acquired prepreg was reduced in width.

Comparative Example 2

A raw yarn (i) of carbon fibers having the single yarn diameter of 7 μm and the filament number of 12 k was spread according to the method of Manufacturing Example 1. The spread carbon fibers (hereinafter also referred to as an "spread tape 9") had the average width of 16 mm, the coefficient of variation (CV) of width of 7.2%, and the average content number of reinforcement fibers in the thickness direction of 5.25. By using the spread tape 9, a tape-shaped unidirectional prepreg 9 was manufactured in the same way as Example 1 except setting the distance B shown in FIGS. 6 to 100 mm and the angle A to 0 degree. Consequently, the acquired prepreg had the average thickness of 0.3 mm, the average width of 5 mm, and the fiber volume fraction (Vf) of 40% (adhesion amount accuracy of ±2%). The acquired prepreg was reduced in width into a rod shape.

The unidirectional prepregs 1 to 9 acquired as described above were measured in terms of the weight-average molecular weight of the resin contained in the unidirectional prepregs, the average content number of reinforcement fibers in the thickness direction of the unidirectional prepregs and the coefficient of variation (CV value) thereof, the average content density of the reinforcement fibers in the width direction, the average thickness, the average width, and the fiber volume fraction according to the measurement method described above or below. The adherability of the resin was evaluated according to an evaluation method described below. The acquired results are shown in Table 1.

The number of contained reinforcement fibers in the thickness direction of the unidirectional prepreg was measured by cutting the acquired prepreg in the thickness direction and observing the cross section thereof magnified 100 to 1000 times by using an electron microscope to count the number of fibers present in the thickness direction in the acquired image. The measurement was performed at least at five positions, and the average value thereof was defined as the average content number of reinforcement fibers in the thickness direction. The standard deviation was calculated from the measurement results of the content number to calculate the coefficient of variation (CV value).

The average content density of reinforcement fibers in the width direction of the unidirectional prepreg was calculated from the average content number of reinforcement fibers in the thickness direction measured as described above and the single yarn diameter of the carbon fiber used in each of Examples and Comparative Examples according to Equation (2) mentioned above.

The average thickness was acquired by measuring the thickness of the unidirectional prepreg every 1 m with a thickness meter and calculating the average value thereof.

The average width was acquired by measuring the width of the unidirectional prepreg at least every 50 cm with respect to the fiber direction with a camera and calculating the average value thereof.

When the fiber volume fraction was measured from the weight per 1 m of the prepreg, the fiber volume fraction was 40% in any of Examples and Comparative Examples. The adhesion amount accuracy was ±2% in any of Examples and Comparative Examples.

The resin adherability was evaluated on both surfaces of the acquired unidirectional prepreg in terms of whether a fiber-exposing portion (friction) is present according to the following criteria:

Criteria for Evaluation of Resin Adherability

A: no fiber-exposing portion is present at all;

B: almost no fiber-exposing portion is present;

C: the number of fiber-exposing portions are slightly large; and

D: the number of fiber-exposing portions are extremely large.

TABLE 1

| | | Average thickness [mm] | Average width [mm] | Average content number [fibers] in thickness direction | CV value [%] of content number in thickness direction | Average content density [fibers/mm] in width direction | Weight-average molecular weight | Resin adherability |
|---|---|---|---|---|---|---|---|---|
| Examples | 1 | 0.071 | 15.1 | 5.2 | 12.1 | 742 | 7500 | A |
| | 2 | 0.06 | 17.1 | 4.4 | 11.7 | 628 | 8000 | A |
| | 3 | 0.10 | 14.1 | 7.0 | 9.5 | 1000 | 10000 | A |
| | 4 | 0.10 | 13.2 | 7.2 | 5.8 | 1028 | 9500 | B |
| | 5 | 0.072 | 78 | 5.2 | 8.1 | 742 | 8700 | A |
| | 6 | 0.075 | 15 | 6.4 | 8.1 | 914 | 6500 | A |
| | 7 | 0.095 | 13 | 6.2 | 6.8 | 885 | 14000 | A |
| Comparative | 1 | 0.17 | 7.1 | 12.0 | 12.4 | 1714 | 9000 | C |
| Examples | 2 | 0.3 | 5 | 21.4 | 13.2 | 3057 | 13000 | D |

The unidirectional prepregs 1 to 9 acquired as described above were evaluated in terms of unidirectionality of the unidirectional prepregs according to the following measurement method. Additionally, the value X was calculated by using the number of reinforcement fibers contained in the unidirectional prepreg as m (fibers), the average content number in the thickness direction as n (fibers), the average width of the unidirectional prepreg as p (mm), and the single yarn diameter of reinforcement fibers as q (mm), from the formula: $\{(m/n)/p\}/(1/q)$. The acquired results are described in Table 2.

In the evaluation of unidirectionality, a middle point of width is obtained at each of both cut end portions of the acquired prepreg; the middle point of one end portion and the middle point of the other end portion are connected to define this line as a reference line; and, on one side of the prepreg relative to the reference line, a length in the width direction (a length that is about a half of the width, hereinafter also referred to as a "half width") is measured at least at ten positions along the fiber direction. The coefficient of variation was calculated from the average value of the half width acquired at ten positions and the standard deviation.

TABLE 2

| | | Half width | | | |
|---|---|---|---|---|---|
| | | Maximum value [mm] | Minimum value [mm] | Coefficient of variation [%] | Value X |
| Examples | 1 | 8 | 7 | 3.9 | 1.07 |
| | 2 | 9 | 8 | 4.3 | 1.12 |
| | 3 | 7.5 | 6.5 | 4.5 | 0.85 |
| | 4 | 7 | 6 | 5.6 | 0.88 |
| | 5 | 42 | 36 | 4.6 | 1.03 |
| | 6 | 7.8 | 7.2 | 2.7 | 1.09 |
| | 7 | 6.8 | 6.1 | 4.0 | 1.04 |
| Comparative | 1 | 4 | 3.1 | 9.7 | 0.99 |
| Examples | 2 | 3 | 2 | 14.2 | 0.79 |

Example 8

The tape acquired in Example 1 was cut to the length in the fiber direction of 20 mm. The unidirectional prepregs acquired in this way were spread in a 300 mm-square mold such that the fiber direction is scattered, and the mold was then heated at 150° C. for ten minutes without pressurization to polymerize the resin contained in the unidirectional prepregs. Subsequently, pressurization was performed at 4 MPa for 20 minutes while maintaining 150° C., and the temperature was then reduced to 80° C. or less before demolding. In this way, a 300 mm-square fiber-reinforced thermoplastic resin sheet 1 of unidirectional prepregs (a non-continuous fiber isotropic sheet that is a random laminated body of unidirectional prepregs) having the average thickness of 2 mm was manufactured.

Example 9

The tape acquired in Example 1 was cut to the length in the fiber direction of 15 mm. The unidirectional prepregs acquired in this way were randomly spread in a 600 mm-square mold such that the fiber direction is scattered, and the mold was then heated at 150° C. for ten minutes without pressurization to polymerize the resin contained in the unidirectional prepregs. Subsequently, pressurization was performed at 4 MPa for 20 minutes while maintaining 150° C., and the temperature was then reduced to 80° C. or less before demolding. In this way, a 600 mm-square fiber-reinforced thermoplastic resin sheet 2 (a non-continuous fiber isotropic sheet that is a random laminated body of unidirectional prepregs) having the average thickness of 2 mm was manufactured.

Example 10

The tape acquired in Example 1 was cut to the length in the fiber direction of 25 mm. A fiber-reinforced thermoplastic resin sheet 3 (a non-continuous fiber isotropic sheet that is a random laminated body of unidirectional prepregs) having the average thickness of 2 mm was manufactured in the same way as Example 9 except using the unidirectional prepregs acquired as described above.

Example 11

A fiber-reinforced thermoplastic resin sheet 4 was manufactured in the same way as Example 8 except using the tape acquired in Example 3.

Example 12

The tape acquired in Example 3 was cut to the length in the fiber direction of 28 mm. A 600 mm-square fiber-reinforced thermoplastic resin sheet 5 (a non-continuous fiber isotropic sheet that is a random laminated body of unidirectional prepregs) having the average thickness of 2 mm was manufactured in the same way as Example 1 except using the unidirectional prepregs acquired as described above.

Example 13

A fiber-reinforced thermoplastic resin sheet 6 was manufactured in the same way as Example 8 except using the tape acquired in Example 6.

Example 14

A fiber-reinforced thermoplastic resin sheet 7 was manufactured in the same way as Example 8 except using the tape acquired in Example 7.

Comparative Example 3

A fiber-reinforced thermoplastic resin sheet 8 was manufactured in the same way as Example 8 except using the tape acquired in Comparative Example 1.

Comparative Example 4

A fiber-reinforced thermoplastic resin sheet 9 was manufactured in the same way as Example 8 except using the tape acquired in Comparative Example 2.

Comparative Example 5

The tape acquired in Manufacturing Example 1 was heated again at 150° C. for 20 minutes to further polymerize the polymer contained in the unidirectional prepreg so as to acquire a unidirectional prepreg containing a polymer having the weight-average molecular weight of 80,000. This prepreg was cut to the length in the fiber direction of 28 mm. The unidirectional prepregs acquired in this way were randomly spread in a 300 mm-square mold such that the fiber direction is scattered, and the mold was then heated at 200° C. for ten minutes without pressurization and was subsequently pressurized at 5 MPa for 20 minutes while maintaining 200° C., and the temperature was then reduced to 80° C. or less before demolding. In this way, a 300 mm-square fiber-reinforced thermoplastic resin sheet 10 (a non-continuous fiber isotropic sheet that is a random laminated body of unidirectional prepregs) having the average thickness of 2 mm was manufactured.

The random laminated bodies 1 to 10 acquired as described above were measured in terms of the weight-average molecular weight (Mw) of the thermoplastic resin B contained in the resin sheet, the average bending strength, and the average bending elastic modulus according to the measurement method described above or below. The cross-sectional quality was evaluated according to an evaluation method described below. The acquired results are shown in Table 3.

The average bending strength and the average bending elastic modulus were measured by using a universal testing machine (100 kN Tensilon) manufactured by Shimadzu Corporation according to ASTM D790. For measurement samples, a multiplicity of test pieces was prepared by cutting out to the length of 80 mm, the width of 35 mm, and the thickness of 2 mm from the random laminated body acquired in each of Examples and Comparative Examples, and ten pieces were taken out and used therefrom. An average value and CV were calculated from the results acquired in ten measurements.

The cross-sectional quality was evaluated by observing a cross section formed by cutting the acquired random laminated body in the thickness direction with an electron microscope in terms of whether the resin was biased according to the following criteria:

Criteria for Evaluation of Cross-Sectional Quality

A: the resin is not biased at all;

B: the resin is almost not biased;

C: the resin is slightly biased; and

D: the resin is extremely biased.

TABLE 3

| | | Prepreg | Weight-average molecular weight | Average bending strength [MPa] (CV [%]) | Average bending elastic modulus [GPa] (CV [%]) | Cross-sectional quality |
|---|---|---|---|---|---|---|
| Examples | 8 | Example 1 | 46000 | 450 (5.8) | 28.9 (7.1) | A |
| | 9 | Example 1 | 37000 | 460 (9.1) | 28.8 (9.7) | A |
| | 10 | Example 1 | 49000 | 475 (13.9) | 29 (10.1) | A |
| | 11 | Example 3 | 47000 | 447 (9.1) | 28.9 (8.2) | A |
| | 12 | Example 3 | 50000 | 455 (12.9) | 28.5 (11.6) | A |
| | 13 | Example 6 | 42000 | 509 (10.6) | 30.0 (17.6) | B |
| | 14 | Example 7 | 43000 | 495 (12) | 32.0 (12) | A |
| Comparative Examples | 3 | Comparative Example 1 | 47000 | 387 (22.6) | 27.1 (28.1) | D |
| | 4 | Comparative Example 2 | 50000 | 320 (31.1) | 26.8 (29.2) | A |
| | 5 | Comparative Example 5 | 83000 | 423 (13.2) | 27.2 (19.4) | D |

The fiber-reinforced thermoplastic resin sheets acquired in Examples and Comparative Examples described above were measured according to the measurement method in terms of the gel fraction of the thermoplastic resin contained in the resin sheets, the average content number of reinforcement fibers in the thickness direction per unidirectional prepreg, the average content density in the width direction, the length in the fiber direction, the number of layers of unidirectional prepregs per unit thickness, and the void fraction of the resin sheets. The results are shown in Table 4.

The average content number of reinforcement fibers in the thickness direction per unidirectional prepreg of the fiber-reinforced thermoplastic resin sheet was measured by cutting the fiber-reinforced thermoplastic resin sheet in the thickness direction and observing the cross section thereof magnified 100 to 1000 times by using an electron microscope to count the number of fibers present in the thickness direction in the acquired image. The measurement was performed at least at five positions, and the average value thereof was defined as the average content number of reinforcement fibers in the thickness direction. The standard deviation was calculated from the measurement results of the content number to calculate the coefficient of variation (CV value).

The length in the fiber direction of the unidirectional prepregs in the fiber-reinforced thermoplastic resin sheet was measured with a caliper.

The number of layers of the unidirectional prepregs in the fiber-reinforced thermoplastic resin sheet was visually measured from an image acquired by cutting the fiber-reinforced thermoplastic resin sheet in the thickness direction and observing the cross section thereof magnified 100 to 1000 times by using an electron microscope. The thickness of the fiber-reinforced thermoplastic resin sheet was measured by using a micrometer. The measurement was performed at each of three positions, and the total number was divided by the thickness to define the average value thereof as the number of layers of unidirectional prepregs per unit thickness in the fiber-reinforced thermoplastic resin sheet.

150° C., then conveyed to a mold (open structure) heated to 180° C., and pressed at the press pressure of 4 MPa for one minute. Cooling of the mold was followed by demolding to acquire a molded product. A mold used for a wheel housing (see FIG. 9) was used for the mold.

The bending strength and the bending elastic modulus of the acquired molded product were measured. A multiplicity of test pieces was prepared by cutting out to the length of 80 mm, the width of 35 mm, and the thickness of 2 mm, and ten pieces were taken out and used therefrom. An average value and CV were calculated from the results acquired in ten measurements. The average bending strength was 453 MPa (CV 16.7%), and the average elastic modulus was 24.4 GPa.

<Moldability Test 3: Stamping Molding>

The fiber-reinforced thermoplastic resin sheet 3 acquired in Example 12 was cut to 450×350 mm square, heated to 240° C., then conveyed to a mold (open structure) heated to 70° C., and pressed at the press pressure of 20 MPa for one minute. The pressing was followed by demolding from the mold to acquire a molded product. A mold used for a wheel housing (see FIG. 9) was used for the mold.

The bending strength and the bending elastic modulus of the acquired molded product were measured. A multiplicity of test pieces was prepared by cutting out to the length of 80 mm, the width of 35 mm, and the thickness of 2 mm, and ten pieces were taken out and used therefrom. An average value and CV were calculated from the results acquired in ten measurements. The average bending strength was 455 MPa (CV 17.7%), and the average elastic modulus was 26.1 GPa.

It was shown that the fiberspread-reinforced thermoplastic resin sheet of the present invention maintains high physical properties without significant deterioration in the physical properties even if the fiber length of the prepregs is changed. The moldability was favorable in any of the moldability tests 1 to 3. Furthermore, as a result of measurement of the physical properties of the acquired molded products in both molding methods of the heat and cool molding and the stamping molding, it was confirmed that the products have high average bending strength and average elastic modulus and less variation in average bending strength. From these results, it was confirmed that the fiber-reinforced thermoplastic resin sheet of the present invention has both high strength and moldability and less variation in strength and that the characteristics of the fiber-reinforced thermoplastic resin sheet of the present invention are maintained in molded products manufactured from the fiber-reinforced thermoplastic resin sheet of the present invention.

TABLE 4

| | | Thermoplastic resin Gel fraction [%] | Reinforcement fiber Average content number [fiber] | Average content density | Length in fiber direction [mm] | Number of layers of unidirectional prepregs | Void fraction [%] |
|---|---|---|---|---|---|---|---|
| Examples | 8 | 0 | 5.4 | 771 | 20 mm | 28 | 0.2 |
| | 9 | 0 | — | — | 15 mm | — | 0.2 |
| | 10 | 0 | — | — | 25 mm | — | 0.3 |
| | 11 | 0 | — | — | 20 mm | — | 0.5 |
| | 12 | 0 | — | — | 28 mm | — | 0.7 |
| | 13 | 0 | — | — | 20 mm | — | 0.6 |
| | 14 | 0 | — | — | 20 mm | — | 0.5 |
| Comparative Examples | 3 | 0 | 12.0 | 1714 | 20 mm | 16 | 0.4 |
| | 4 | 0 | — | — | 20 mm | — | 0.4 |
| | 5 | 0 | — | — | 28 mm | — | 1.3 |

As a result of the measurement of the average tensile strength, the average tensile elastic modulus, the coefficient of variation of tensile strength, and the water absorption of the fiber-reinforced thermoplastic resin sheet acquired in Example 9 according to the measurement method, the average tensile strength was 266 MPa (CV 9.5%), the average tensile elastic modulus was 30.6 GPa, and the water absorption was 0.18%.

<Moldability Test 1>

The fiber-reinforced thermoplastic resin sheets acquired in Example 9 and Comparative Example 5 were cut to 500×200 mm square and heated by a far-infrared heater at 190° C. and 200° C. After heating, the resin sheet was conveyed to a mold (open structure), and pressed at the press pressure of 10 MPa for 20 seconds by using the mold at normal temperature (about 10° C.). The pressing was performed by using a press machine of the crank press specification, and a mold used for a B-pillar of an automobile (see FIG. 7 (view from the convex surface side of the mold)) and FIG. 8 (view when obliquely viewed)). From all the samples of the fiber-reinforced thermoplastic resin sheets acquired in Examples, molded products having an extremely clear transfer property were acquired without a resin sink mark etc. regardless of a difference in the heating temperature. The fiber-reinforced thermoplastic resin sheet acquired in Comparative Example 5 resulted in a poor surface transfer property and a large number of sink marks observed on a surface.

<Moldability Test 2: Heat and Cool Molding>

The fiber-reinforced thermoplastic resin sheet 2 acquired in Example 10 was cut to 450×350 mm square, heated to

EXPLANATIONS OF LETTERS OR NUMERALS

1 matrix resin
2 reinforcement fiber
3 void
4 raw yarn
5 raw-yarn bobbin holder
6 feeding tension generating motor
7 yarn guide
7*a* preceding yarn guide
7*b* subsequent yarn guide
8 traverse guide
9 unspread reinforcement fibers
10 width guide
11 opening tank
12 opening solution
13*a* to 13*h* opening guide
14 drying roller
15 driving roller
16 winding part
17 winding package of spread reinforcement fiber
18 spread reinforcement fibers
19 yarn guide roller
20 resin discharge die
20*a* upper-surface die head
20*b* lower-surface die head
21 conveyance belt guide roller
22 conveyance belt
23 drying furnace
24 cooling apparatus
25 unidirectional prepreg tape

What is claimed is:

1. A fiber-reinforced thermoplastic resin sheet containing spread reinforcement fibers and a thermoplastic resin and made up of a random laminated body of unidirectional prepregs, wherein an average content number of reinforcement fibers in a thickness direction of the unidirectional prepregs is 4.4 to 8, wherein the thermoplastic resin is a polymer of a bisphenol A epoxy compound represented by Formula (1):

(1)

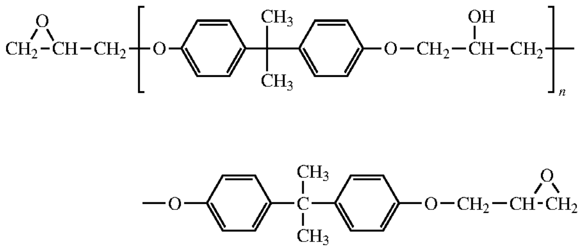

where n is an integer of 1 to 4 and a bisphenol compound selected from the group consisting of bisphenol A, bisphenol F, bisphenol S, bisphenol B, bisphenol E, and bisphenol P, and wherein the polymer has a weight-average molecular weight of 40,000 to 60,000, and wherein the fiber-reinforced thermoplastic resin sheet has a void fraction of 1 vol % or less when measured according to JIS-7075, wherein the unidirectional prepregs are uniformly impregnated with the thermoplastic resin, wherein an average width of the unidirectional prepregs is 13 to 18 mm, wherein an average thickness of the unidirectional prepregs is 60 to 100 μm, wherein a coefficient of variation of width of the unidirectional prepreg is 5% or less, wherein a coefficient of variation of the number of reinforcement fibers contained in the thickness direction in the unidirectional prepreg is 20% or less, and m, n, p, and q satisfy following Eq. (3):

$$0.7 \leq \frac{\{(m/n)/p\}}{(1/p)} \leq 1.3 \qquad (3)$$

wherein, the number of reinforcement fibers contained in the unidirectional prepreg is m (fibers), the average content number of reinforcement fibers in the thickness direction is n (fibers), the average width of the unidirectional prepreg is p (mm), and the single yarn diameter of reinforcement fibers is q (mm).

2. The fiber-reinforced thermoplastic resin sheet according to claim 1, wherein the respective unidirectional prepregs each has a length of 10 to 50 mm in the fiber direction.

3. The fiber-reinforced thermoplastic resin sheet according to claim 1, wherein the reinforcement fibers are carbon fibers.

4. The fiber-reinforced thermoplastic resin sheet according to claim 1, wherein the fiber-reinforced thermoplastic resin sheet has a water absorption of 1 wt % or less when measured according to JIS K 7209.

5. The fiber-reinforced thermoplastic resin sheet according to claim 1, wherein the fiber-reinforced thermoplastic resin sheet has a coefficient of variation of a bending strength of 0 to 20%.

6. The fiber-reinforced thermoplastic resin sheet according to claim 1, wherein the fiber-reinforced thermoplastic resin sheet has a coefficient of variation of a tensile strength of 0 to 20%.

7. The fiber-reinforced thermoplastic resin sheet according to claim 1, wherein the fiber-reinforced thermoplastic resin sheet has a water absorption measured according to JIS K 7209 of 0 to 0.3 wt %.

8. The fiber-reinforced thermoplastic resin sheet according to claim 1, wherein the average interfacial shear strength of the reinforcement fiber contained in the fiber-reinforced thermoplastic resin sheet and the thermoplastic resin contained in the fiber-reinforced thermoplastic resin sheet is 50 MPa or more.

9. The fiber-reinforced thermoplastic resin sheet according to claim 1, wherein the reinforcement fibers are carbon fibers having a filament number of 6000 to 24000.

10. The fiber-reinforced thermoplastic resin sheet according to claim 1, wherein a coefficient of variation of the half width is 9% or less.

11. The fiber-reinforced thermoplastic resin sheet according to claim 1, wherein a coefficient of variation of the half width is 7% or less.

12. A molded body comprising a fiber-reinforced thermoplastic resin sheet, the fiber-reinforced thermoplastic resin sheet containing spread reinforcement fibers and a thermoplastic resin and made up of a random laminated body of unidirectional prepregs, wherein an average content number of reinforcement fibers in a thickness direction of the unidirectional prepregs is ten or less, wherein the thermoplastic resin is a polymer of a bisphenol A epoxy compound represented by Formula (1):

(1)

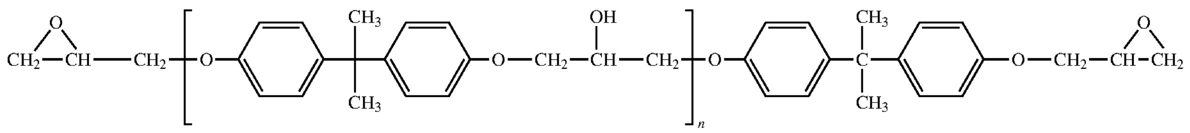

where n is an integer of 1 to 4 and a bisphenol compound selected from the group consisting of bisphenol A, bisphenol F, bisphenol S, bisphenol B, bisphenol E, and bisphenol P, and wherein the polymer has a weight-average molecular weight of 40,000 to 60,000, and wherein the fiber-reinforced thermoplastic resin sheet has a void fraction of 1 vol % or less when measured according to JIS-7075, wherein the unidirectional prepregs are uniformly impregnated with the thermoplastic resin, wherein an average width of the unidirectional prepregs is 18 mm or less, wherein an average thickness of the unidirectional prepregs is 60 to 100 μm, and wherein a coefficient of variation of width of the unidirectional prepreg is 5% or less, wherein a coefficient of variation of the number of reinforcement fibers contained in the thickness direction in the unidirectional prepreg is 20% or less, and m, n, p, and q satisfy following Eq. (3):

$$0.7 \leq \frac{\{(m/n)/p\}}{(1/p)} \leq 1.3 \tag{3}$$

wherein, the number of reinforcement fibers contained in the unidirectional prepreg is m (fibers), the average content number of reinforcement fibers in the thickness direction is n (fibers), the average width of the unidirectional prepreg is p (mm), and the single yarn diameter of reinforcement fibers is q (mm).

13. The molded body according to claim 12, wherein the reinforcement fibers are carbon fibers having a filament number of 6000 to 24000.

14. The molded body according to claim 12, wherein a coefficient of variation of the half width is 7% or less.

15. The molded body according to claim 12, wherein a coefficient of variation of the half width is 9% or less.

16. A molded body formed from the fiber-reinforced thermoplastic resin sheet according to claim 1, consisting of the random laminated body of unidirectional prepregs.

* * * * *